(12) United States Patent
Ceekala et al.

(10) Patent No.: US 11,329,844 B2
(45) Date of Patent: May 10, 2022

(54) SELECTED MODE SIGNAL FORWARDING BETWEEN SERIALLY CHAINED DEVICES

(71) Applicant: Texas Instruments Incorporated, Dallas, TX (US)

(72) Inventors: Vijaya Ceekala, San Jose, CA (US); Xin Liu, Saratoga, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 32 days.

(21) Appl. No.: 16/578,759

(22) Filed: Sep. 23, 2019

(65) Prior Publication Data

US 2020/0374153 A1   Nov. 26, 2020

Related U.S. Application Data

(63) Continuation-in-part of application No. 16/420,396, filed on May 23, 2019, now Pat. No. 10,904,478.

(51) Int. Cl.
*H04L 12/40* (2006.01)

(52) U.S. Cl.
CPC .. *H04L 12/40039* (2013.01); *H04L 12/40013* (2013.01); *H04L 2012/40273* (2013.01)

(58) Field of Classification Search
None
See application file for complete search history.

(56) References Cited

U.S. PATENT DOCUMENTS

| 7,362,779 | B1 | 4/2008 | Zabezhinsky |
| 9,128,690 | B2 | 9/2015 | Lotzenburger et al. |
| 9,363,067 | B2 | 6/2016 | Ceekala et al. |
| 10,904,478 | B2 | 1/2021 | Ceekala et al. |
| 10,999,559 | B1 | 5/2021 | Pertsel et al. |
| 2001/0012692 | A1 | 8/2001 | Miller et al. |
| 2002/0002582 | A1* | 1/2002 | Ewing ............ G06F 1/3246 709/202 |

(Continued)

FOREIGN PATENT DOCUMENTS

| GB | 2560570 | 9/2018 |
| WO | 2013090565 | 6/2013 |

(Continued)

OTHER PUBLICATIONS

International Search Report in corresponding PCT Application No. PCT/2020/04489, dated Jul. 30, 2020 (2 pages).

(Continued)

*Primary Examiner* — Lonnie V Sweet
(74) *Attorney, Agent, or Firm* — John R. Pessetto; Charles A. Brill; Frank D. Cimino

(57) ABSTRACT

In described examples, a circuit is adapted to receive an input signal at a local port or a first system port. A transceiver is configured to enter a first mode in response to a local wakeup signal and is configured to transmit a system wakeup signal at a second system port in response to the local wakeup signal. A controller is configured to generate the local wakeup signal in response to an energy detected signal. An energy detector is coupled to the first system port and the local port and is configured to generate the energy detected signal in response to a detection of energy of one of the first system input signal and the local input signal received by the transceiver in the second mode.

5 Claims, 10 Drawing Sheets

(56) References Cited

U.S. PATENT DOCUMENTS

| | | |
|---|---|---|
| 2002/0116705 A1 | 8/2002 | Perlman et al. |
| 2002/0118696 A1 | 8/2002 | Suda |
| 2007/0255885 A1 | 11/2007 | Bohm |
| 2008/0175587 A1* | 7/2008 | Jensen ............... H04L 1/22 398/2 |
| 2009/0018467 A1* | 1/2009 | Chiu ............... A61B 10/0266 600/562 |
| 2009/0021955 A1* | 1/2009 | Kuang ............... H05B 47/11 362/479 |
| 2009/0094658 A1 | 4/2009 | Kobayashi |
| 2009/0160868 A1 | 6/2009 | Yato |
| 2009/0278763 A1 | 11/2009 | Zeng et al. |
| 2009/0319714 A1 | 12/2009 | James |
| 2010/0155493 A1 | 6/2010 | Russell |
| 2012/0062800 A1 | 3/2012 | Sisto et al. |
| 2012/0134394 A1* | 5/2012 | Allen ............... H04L 25/4917 375/219 |
| 2013/0191570 A1 | 7/2013 | Lee |
| 2014/0040477 A1 | 2/2014 | King et al. |
| 2016/0337732 A1* | 11/2016 | Al-Walaie ............ H04B 10/032 |
| 2016/0359741 A1 | 12/2016 | Cooper et al. |
| 2017/0010329 A1* | 1/2017 | Tang ............... H04Q 9/00 |
| 2018/0060269 A1 | 3/2018 | Kessler |
| 2018/0224920 A1* | 8/2018 | Oakley ............ H04L 29/06517 |
| 2019/0044995 A1 | 2/2019 | Amidei et al. |
| 2019/0179588 A1* | 6/2019 | Chu ............... G08B 5/228 |
| 2019/0289098 A1* | 9/2019 | Chen ............... G06F 3/04842 |
| 2019/0313053 A1 | 10/2019 | Chane et al. |

FOREIGN PATENT DOCUMENTS

| | | |
|---|---|---|
| WO | 2014039980 | 3/2014 |
| WO | 2016070197 | 5/2016 |

OTHER PUBLICATIONS

International Search Report in corresponding PCT Application No. PCT/2020/034495, dated Aug. 13, 2020 (2 pages).

International Search Report in corresponding PCT Application No. PCT/2020/056968, dated Feb. 11, 2021 (2 pages).

* cited by examiner

US 11,329,844 B2

SELECTED MODE SIGNAL FORWARDING BETWEEN SERIALLY CHAINED DEVICES

CROSS-REFERENCE TO RELATED APPLICATION(S)

This continuation-in-part application claims priority to U.S. patent application Ser. No. 16/420,396, filed May 23, 2019, which is incorporated herein by reference in its entirety.

BACKGROUND

In some electronic systems, various components are coupled by a physical layer that can include connectors and electrical wiring. In some applications, limits on the functionality of the various components can be constrained by the cost, size, and numbers of the connectors and/or the cost, size, and numbers of individual wires in the electrical wiring.

SUMMARY

In described examples, a circuit is adapted to receive an input signal at a local port or a first system port. A transceiver is configured to enter a first mode in response to a local wakeup signal and is configured to transmit a system wakeup signal at a second system port in response to the local wakeup signal. A controller is configured to generate the local wakeup signal in response to an energy detected signal. An energy detector is coupled to the first system port and the local port and is configured to generate the energy detected signal in response to a detection of energy of one of the first system input signal and the local input signal received by the transceiver in the second mode.

DETAILED DESCRIPTION

Figure 1:
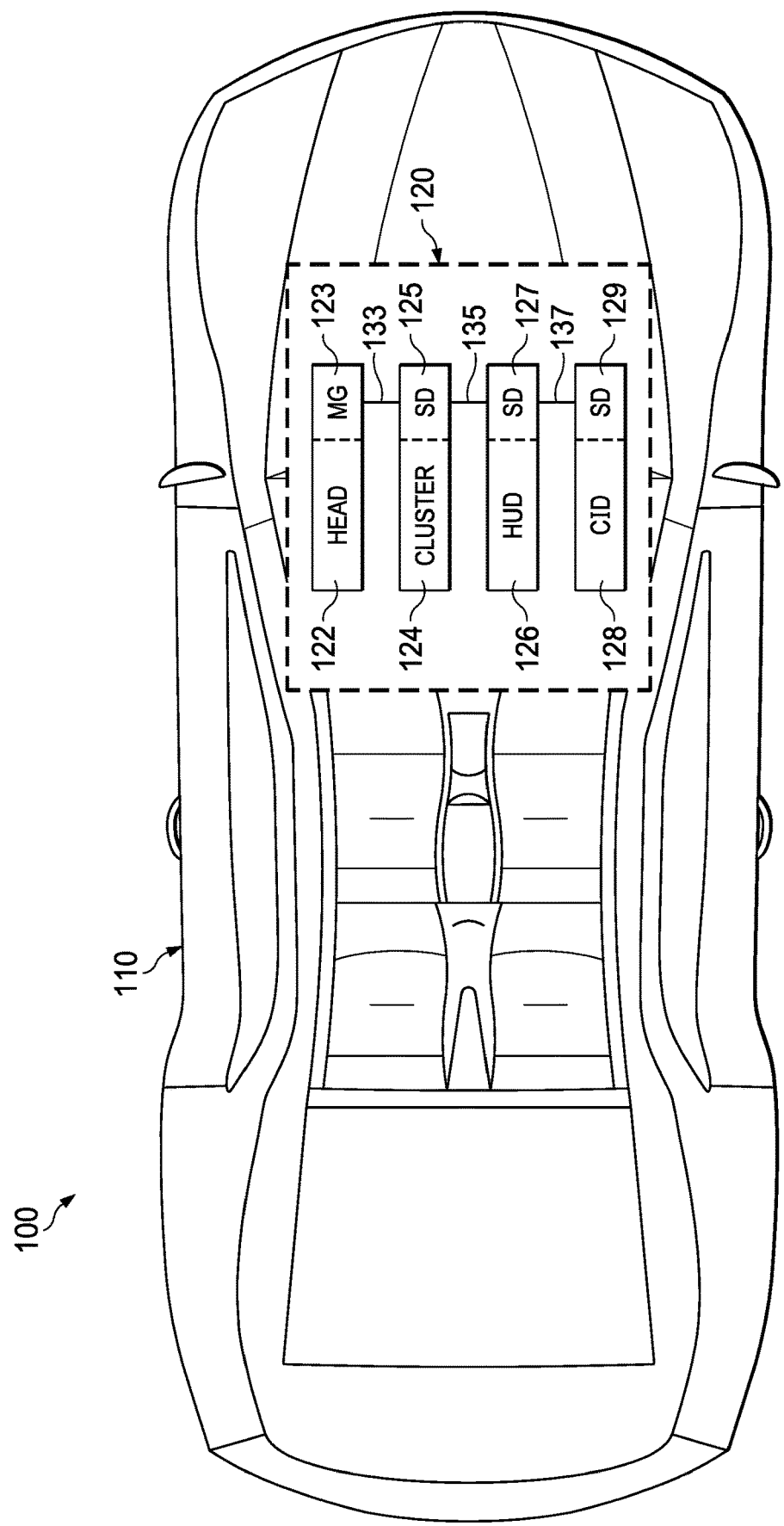
FIG. 1 is a system diagram showing an example vehicle that includes an example system adapted to selectively forward transmissions between serially chained devices of the example system.

In the drawings, like reference numerals refer to like elements, and the various features are not necessarily drawn to scale.

Various electronic systems employ components coupled together to comprise the system. As the functionality of the system increases, the complexities of the interconnections increase. As more functionality is added to the system (e.g., in response to increased integration and processing power), the numbers of terminals of the connectors increase, which, in turn, increase the size, complexity, and/or cost of the connectors.

Some electronic systems can be installed in a transportation platform (such as an airplane or motor vehicle). Limitations in the structure of the mobile platform (e.g., due to human factors, safety considerations, and aerodynamic performance) can limit the space otherwise afforded to the connectors and cabling of an electronic system. Further, access to the connectors and cabling (e.g., for testing, replacement, and/or repair) can be limited (which can increase operating costs), such as when the electronic system is installed in a dashboard (that can include at least one airbag) of a vehicle.

An example of an electronic system that can be installed in a mobile platform is an automotive "infotainment" system, in which video data can be generated by (or otherwise transmitted by) a control unit (e.g., a head-unit or other data source). The generated video data can be transferred to multiple display panels (e.g., a heads-up display, an instrument cluster, and a center-instrument display). To send different types of display data to different displays from a control unit, various cables/connectors are arranged between the control unit and each of the different displays. A cable adapted to convey signals between two units (such as a display and a control unit) has a first connector (e.g., a first set of connectors) adapted to connect to first mating connector(s) of a first unit, a second connector (e.g., a second set of connectors) adapted to connect to a second mating connector(s) of a second unit, and a cable harness (e.g., flexible cable harness) having insulated wiring arranged to electrically couple signals (e.g., unidirectional and/or bidirectional signals) between the first and second connectors.

In an example, multiple displays can be connected to the control unit in a one-to-many configuration with the connecting cables converging upon the control unit at a single location (e.g., a surface of the control unit). For example, a master control unit can include a connector and cable pair for communicating with each slave device of the system (e.g., in a star-network topology). The convergence of the connectors and cables at the control unit creates mechanical spacing issues in which the convergence of multiple connectors located side-by-side occupy significant space in an automobile vehicle. Further, video information (e.g., such as at least one video stream) from a control unit is high-resolution data that is streamed continuously to respective displays via a respective connector/cable pair. Because of the point-to-point connections of the star topology, each video stream need not be associated with networking addresses or be otherwise identified. Conventionally, video data from a head unit that is being transferred to displays is high resolution data being streamed continuously and is not in a format that can be readily networked, as in some other data-networking applications.

As described herein, an example system is adapted to selectively forward transmissions between serially chained devices of the example system. For example, the example system can include a control unit coupled to a serial chain (e.g., one end of a serial chain) of display units. An example multistream generator can be coupled to an output of the control unit, so that the example multistream generator can encode (e.g., encapsulate) video data from multiple streams into a format adaptable to different types of displays in the serial chain (e.g., daisy-chained displays). The mechanical spacing issues of congestion due to cable/connector convergence at a control unit location can be reduced by arranging the example system components as shown in FIG. 1.

FIG. 1 is a system diagram showing an example vehicle that includes an example system adapted to selectively forward transmissions between serially chained devices of the example system. Generally described, the system 100 is an example system that includes a host vehicle 110. An example multiple display system 120 can be installed in the host vehicle 110. The example multiple display system 120 can include any number of displays in a serial chain, one end of which can be connected to a control unit.

An example multiple display system 120 can include a control unit (e.g., head unit 122), a first display (e.g., instrument cluster display CLUSTER 124), a second display (e.g., heads-up display HUD 126), and a third display (e.g., center-instrument display CID 128). The example multiple display system can include one or more head units 122. A head unit 122 is adapted to receive sensor data (e.g., from cameras or instrumentation sensors) and generate video streams in response to the sensor data. Each head unit 122 transmits at least one generated video stream, each of which is received by the multistream generator 123. However, the use of multiple head units increases system complexity, creates additional nodes of failure, increases costs, and occupies more space, for example, in confined areas.

The multistream generator 123 (MG) can have an input (e.g., video input) coupled to (e.g., can be included by) the head unit 122 and can have an output coupled (e.g., via cable 133) to an input of the stream disaggregator 125. In an example, the multistream generator 123 can receive a video stream from a respective head unit 122. In some examples, the multistream generator 123 can receive a video stream from at least one head unit 122 (e.g., so that one or more video streams can be generated by a head unit 122 for stream aggregation by the multistream generator 123).

The stream disaggregator 125 can have a first output (e.g., local output) coupled to (e.g., can be included by) the display CLUSTER 124 and can have a second output (e.g., system output) coupled (e.g., via cable 135) to an input of the stream disaggregator 127.

The stream disaggregator 127 can have a first output (e.g., local output) coupled to (e.g., can be included by) the display HUD 126) and can have a second output (e.g., system output) coupled (e.g., via cable 137) to an input of the stream disaggregator 129.

The stream disaggregator 129 (SD) can have a first output (e.g., local output) coupled to (e.g., that can be included by) the display CID 128 and can have a second output (e.g., system output) optionally coupled (e.g., via another cable, not shown) to an input of an optional stream disaggregator (not shown) for display. Other stream disaggregators can be successively concatenated to the tail of the serial chain connecting the serially chained displays (e.g., where the tail of the serial chain is opposite to the end of the serial chain connected to the head unit 122). (An example cabling network is described hereinbelow with respect to FIG. 4.)

As compared against a star-topology display system for three displays (which includes three cables and respective connectors converging at a location of the control unit), the serially chained display system described herein reduces space and mechanical constraints, (e.g., so that the constraints are reduced to the space of having a solitary connector/cable connected at the head unit 122).

The multistream generator 123 is arranged to encode high-resolution, real-time video data (including video-associated data) into a packet format. Operation of a multistream generator is described hereinbelow with reference to FIG. 3. The multistream generator 123 can be arranged as a serializer (e.g., which is adapted to serially output video data, where the video data can be received asynchronously by the multistream generator 123 in a serial or parallel format) and/or can be arranged to output the video data in a parallel manner. Each packet can include an identifier (e.g., stream identifier) for identifying a particular video stream being encoded and/or for identifying a destination of the packet (e.g., identifying the display to which the packet is addressed). The identifier can be parsed by a stream disaggregator in accordance with a mode (e.g., a default or programmed configuration) associated with a respective stream disaggregator. Each packet is received by at least one stream disaggregator for forwarding (and/or decoding/deserializing).

A stream disaggregator (e.g., 133, 135, and 137) is arranged to receive the packet (e.g., which has an identifier for indicating a destination display) and to select between a stream disaggregator first output (e.g., a local output for coupling information to a locally coupled display) and a stream disaggregator second output (e.g., a system output for forwarding information to at least one other stream disaggregator).

Figure 2:
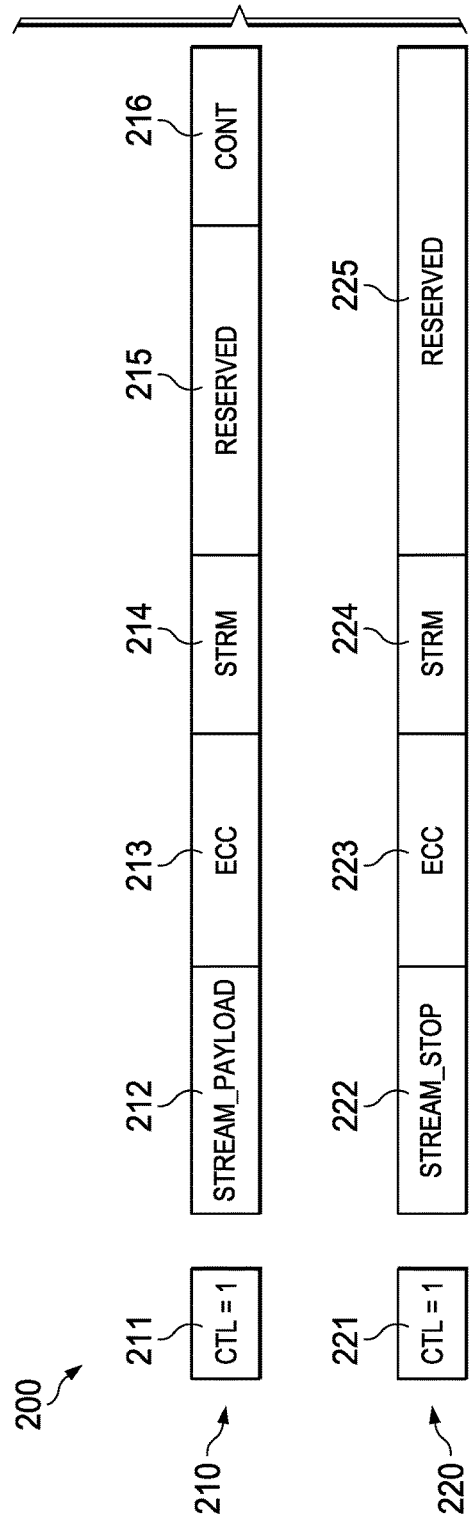
FIG. 2 is a diagram of example transmissions in an example system adapted to selectively forward transmissions between serially chained devices.

FIG. 2 is a diagram of example transmissions in an example system adapted to selectively forward transmissions between serially chained devices. Generally described, the transmissions 200 are example transmissions that are arranged in a packet format. The example transmissions can include streaming data for streaming video. The streaming video data can include audio data coupled to (e.g., synchronized with) the streaming video. The streaming data can include content for displaying moving and/or stationary images.

In a first example packet (such as packet 210), the packet 210 includes a control (CTL) field 211, a payload (e.g., STREAM_PAYLOAD) field 212, an error-correction code (ECC) field 213, a stream/destination (STRM) field 214, a reserved field 215, and a continuation (CONT) field 216.

The field 211 can indicate whether the stream payload (e.g., field 212) includes command data or streaming data. Command data included by the field 212 can include: a start command, for example, for starting a playing of a selected video stream; a configuration command, for example, for configuring modes, selecting a particular protocol (e.g., from amongst various proprietary or industry standards) by which a particular stream disaggregator communicates with a connected local display (e.g., directed cabled local display), setting a playback channel for a particular display (e.g., for playing at least one selected stream that includes a selected STRM field 214 value); a routing command for selecting at least one stream to be routed to a local display (e.g., of a particular stream disaggregator); and/or a forwarding command for selecting at least one stream to be forwarded to another stream disaggregator (e.g., so that a first disaggregator forwards a selected stream to a second stream disaggregator that is downstream from the first stream disaggregator and a head unit). In an example, configuration data can be reprogrammed (e.g., at system integration, such as at a car factory) into a particular stream disaggregator (e.g., so that configuration time is reduced) and command data can be used in operation to reprogram a given configuration (e.g., whether the given configuration is reprogrammed or programmed in operation).

Streaming data included by the field 212 can include video (e.g., still or moving video) information, audio information, or combinations thereof. The resolution of the streaming data can be selected to provide a video (and/or sound) quality commensurate with a particular display and/or target functionality. Streamed video data can include pixel information. An example pixel can include 8 bits of red information, 8 bits of green information, and 8 bits of blue information. The numbers of rows and columns of pixels can be selected to generate a video frame that corresponds to the capabilities of a particular display screen. A video frame can be encoded as transmission symbols and/or as compressed information for transmission and subsequent decoding by a target display. The video frames can be streamed (e.g., transmitted as a temporal sequence of video frames associated with a particular video "feed").

The field 213 includes an ECC code (e.g., for error detection and correction). The number of the bits of field 213 can be increased (e.g., from a one-bit parity bit to larger numbers of bits) to provide increasing levels of detection—and even correction—of errors that can occur in the packet 210 that is being transmitted and received. A receiver can evaluate the ECC code of a received packet against other bits of the received packet, for example, to correct a corrupted packet and/or request (e.g., by transmitting upstream) a retransmission of the original packet (e.g., the original packet data). The length of the ECC field can be selected to provide a level of performance for a particular functionality (e.g., for dashboard displays as compared against a less-critical infotainment display unit for viewing by a back-seat passenger).

The field 214 includes information that helps identify the display to which a received packet is to be routed. The number of bits in the field 214 is sufficient to uniquely identify a particular stream (e.g., video channel) and/or display (e.g., at least one display for consuming and playing back a stream associated with the received packet). In a first example: the field 214 includes sufficient bits to identify a particular stream (e.g., a channel number), where the stream disaggregators are programmed (e.g., via the herein-described configuration commands) to route the received packet to at least one display (e.g., that is set to the channel number, so that more than one display can playback the same stream). In a second example: the field 214 includes sufficient bits to identify a particular display (e.g., an instrument panel or an electronic side-view "mirror" display) upon which the particular received packet is to be displayed. In a third example: the field 214 includes sufficient bits to indicate a code for selecting a predefined routing configuration for consuming (e.g., routing to a local display) and/or forwarding the particular received packet. In a fourth example, the field 214 includes sufficient bits to include combinations (e.g., some or all combinations) of the functionality described herein for the first, second, and third examples.

The field 215 is reserved for conveying data for an undefined (e.g., unpublished or not-yet published) purpose. For example, a reserved field does not necessarily carry useful data in an earlier system but could be used to convey useful information in a later system, so that the packet length need not be changed to make room for carrying the later-implemented information. The field 215 can include sufficient bits to extensibly transmit and receive for packets having a common packet length (e.g., in accordance with a follow-on protocol standard related to at least one existing FPD standard or in accordance with a later-developed proprietary protocol).

The field 216 indicates whether the packet is the last packet in a stream. In an example where the field 216 indicates the last packet in a steam, a display consuming the packet can take an action in response to the indication that the particular received packet is the last packet in a stream. An example action (e.g., that is taken in response to the indication that the particular received packet is the last packet in a stream) can be a provisional action (e.g., a quickly reversible action) such as dimming a display selected to display a stream associated with the particular received packet. Packet transmission and forwarding is described hereinbelow with reference to FIG. 4.

In a second example packet (such as packet 220), the packet 220 includes a control (CTL) field 221, a stop (e.g., STREAM STOP) field 222, an error-correction code (ECC) field 223, a stream/destination (STRM) field 224, and a reserved field 225.

The field 221 can indicate whether the stream payload includes command data (such as a stop command of field 222). Command data included by the field 222 can include the stop command. In response to a transmitted stop command, downstream stream disaggregator(s) and display(s) identified by the field 224 can power-down, reinitialize, and/or reallocate resources previously allocated for displaying the stream associated with the received packet (e.g., the packet that includes the stop command). In an example, the field 222 can include commands for terminating operation of programmable hardware adapted to display video information (e.g., a code in the stop field 222 can indicate the instant packet is the last packet in a video stream indicated by the field 224).

The field 223 includes an ECC code (e.g., for error detection and correction) such as a code include by the field 213.

The field 224 is a field similar to field 214 and can include information for indicating which stream is associated with the packet and/or for indicating the display to which the packet is to be sent.

The field 225 is a field similar to field 215. A continuation field, such as field 216, need not be implemented in a packet that include a stop field because the presence of a stop field can be used to determine that a packet that includes a stop field is the last packet in the stream. Using the stop field to infer that the stream is to be terminated frees the space otherwise used by the continuation field in a packet having a stop field to be reserved for a potential future use (e.g., a future use for an arbitrary purpose).

Figure 3:
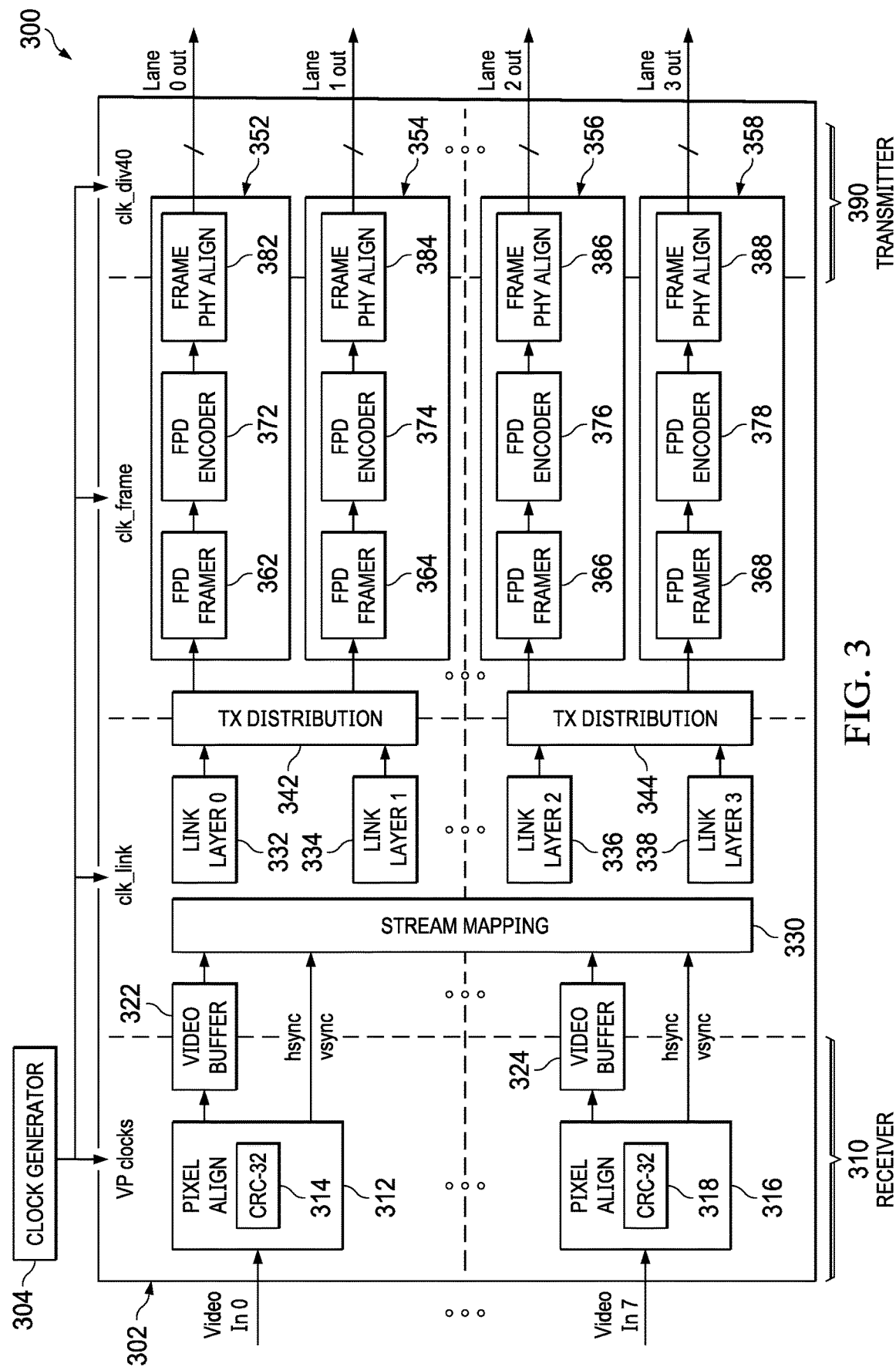
FIG. 3 is a block diagram of an example multistream generator adapted to aggregate input streams in an example system adapted to selectively forward transmissions between serially chained devices.

FIG. 3 is a block diagram of an example multistream generator adapted to aggregate input streams in an example system that is adapted to selectively forward transmissions between serially chained devices. The multistream generator 300 is an example multistream generator that can be arranged on a substrate 302. The multistream generator 302 includes an input (e.g., a receiver 310) that is adapted to receive at least one video stream from a selected head unit and an output (e.g., a transmitter 390) that is adapted to forward packetized video stream(s) to a first stream disaggregator. The packetized video streams can be generated (e.g., sourced) by a video source (such as a digital camera) in accordance with a MIPI (mobile industry peripheral interface) camera serial interface (CSI). The video sources for generating the example video 0 through video 7 streams can include sensors (e.g., sensors 402), which can include various cameras such as backup or side-view cameras, where each camera can be arranged to generate a respective video stream. The video sources for generating the example video 0 through video 7 streams can also include the head unit (e.g., head unit 401) itself, which can generate, in response to sensors such as sensors 402, at least one video stream for display (as described hereinbelow with respect to FIG. 4).

In one example, the clock generator 304 is arranged on the substrate 302 and is adapted to generate clock signals such as video pixel clocks (VP clocks), video link layer clocks (vclk_link), frame clocks (clk_frame), and lane clocks (clk_div40). In some examples, some of the clock signals can be generated by circuitry not included on the substrate 302. Moreover, the architecture of the multistream generator is scalable (e.g., by powers of two), so that the multistream generator can aggregate a selected number (e.g., eight or more) of video streams (which can be addressed by including a sufficient number of bits in field 214 and field 224). In some examples, the receiver can include a transmitter, so that information can be transmitted (e.g., in a second, opposite direction) from an example receiver 310. The multistream generator 300 can be adapted to transfer data bidirectionally (e.g., at 165 megabits per second upstream or at 13 gigabits per second downstream), where an example of bidirectional transmission/reception of transferred data is described in U.S. Pat. No. 9,363,067, issued Jun. 7, 2016, entitled Data signal transceiver circuitry for providing simultaneous bi-directional communication via a common conductor pair, the entirety of which is incorporated herein by reference.

For a first video stream (e.g., Video In 0) in the example multistream generator 300, a pixel aligner 312 is adapted to sample a first video transmission, to align (e.g., synchronize) the sampled data with an internal clock (e.g., a VP clock) of the multistream generator 300, and to generate horizontal synchronization (hsync) and vertical synchronization (vsync) information (e.g., for identifying pixel location of received pixel data). The sampled data is validated by checking for errors (and correcting, if possible) by 32-bit cyclical redundancy checker (CRC) 314. The validated information is stored in the video buffer 322 and is temporally associated with hsync and vsync information, so that, for example, start and stop packets can be respectively associated with the beginning and the end of a video frame to be displayed. The video stream can be received (e.g., from a head unit) as a serial or parallel stream, accessed from system memory (e.g., frame memory), and/or transmitted/accessed by combinations thereof.

The stream mapper 330 is adapted to receive stream (e.g., Video In 0 stream) information from the video buffer 322 and the associated hsync and vsync signals. In response to the video buffer 322 information and the associated hsync and vsync signals, the stream mapper 330 is configured to associate a particular video stream with a particular display (e.g., by setting the value of a STRM field such as field 214 or field 224).

The lane-0 link layer 332 is arranged to generate signals (for example) adapted to control physical layer parameters for transmitting data on lane-0 in accordance with a system protocol (e.g., FPD protocol, which is described hereinbelow). The lane-1 link layer 334 is arranged to generate link control signals (for example) adapted to control physical layer parameters for transmitting data across lane-1 in accordance with a system protocol. The link control signals can be generated in synchronization with (e.g., in response to) the video link layer clocks.

Packets from a particular stream (e.g., Video In 0 stream) can be transmitted across either lane-0 or lane-1 in response to an assignment made by the transmission distributor (TX distributor) 342. The TX distributor 342 can allocate at least one transmission lane, so that pixels of a video frame can be transmitted at a rate sufficient to fulfill frame rates of the display indicated by the STRM field. A first output of the TX distributor 342 is coupled to transfer lane-0 data to an input of the framer 352, and a second output of the TX distributor 342 is coupled to transfer lane-1 data to an input of the framer 354. The pixels of a video frame can be transmitted in synchronization with a frame clock. In some examples, a particular lane can be associated with a respective display (e.g., as a system design choice), so that a video stream can be associated with (e.g., forwarded to) a respective display. In some examples, lanes can be dynamically assigned on the basis of network traffic, so that a lane can carry different video streams (e.g., where a stream disaggregator is adapted to associate received packets of a particular video stream with a particular display and, in response, to forward/transmit packets of a given video stream towards the correct display).

The framer 352 and framer 354 are adapted to generate transmission frames in accordance with a system protocol, such as a low-voltage differential-signaling (LVDS) protocol. The system protocol can be an LVDS standard, such as a flat-panel display link (FPD) protocol (e.g., FPD-Link I, FPD-Link II, FPD-Link III, and any follow-on standard related to at least one existing FPD standard). The system protocol can also include a "sub-LVDS standard," current-mode and/or voltage mode drivers/receivers, and other such low power, high-speed signaling protocols (including a gigabit multimedia serial link—GMSL). The FPD framer 362 is adapted to align data for transmission within a transmission frame, the FPD encoder 372 is adapted to encode the aligned data as symbols for transmission within the transmission frame, and the FPD frame physical aligner (FRAME PHY ALIGN) 382 is adapted to buffer the encoded symbols for synchronous transmission (e.g., as clocked by a lane clock) by transmitter 390 across lane-0. The FPD framer 364 is adapted to align data for transmission within a transmission frame, the FPD encoder 374 is adapted to encode the aligned data as symbols for transmission within the transmission frame, and the FPD frame physical aligner (FRAME PHY ALIGN) 384 is adapted to buffer the encoded symbols for synchronous transmission by transmitter 390 across lane-1. The encoded symbols can be decoded, for example as described hereinbelow, by a receiver such as receiver 422 and encoded by a stream forwarder (e.g., stream transmitter) such as stream forwarder 426.

For a second video stream (e.g., Video In 7) in the example multistream generator 300, a pixel aligner 316 is adapted to sample a video transmission, to align the sampled data with an internal clock of the multistream generator 300, and to generate horizontal synchronization (hsync) and vertical synchronization (vsync) information. The sampled data is validated by checking for errors by 32-bit cyclical redundancy checker (CRC) 318. The validated information is stored in the video buffer 324 and is temporally associated with hsync and vsync information, so that, for example, start and stop packets can be respectively associated with the beginning and the end of a video frame to be displayed.

The stream mapper 330 is adapted to receive stream (e.g., Video In 7 stream) information from the video buffer 324 and the associated hsync and vsync signals. In response to the video buffer 324 information and the associated hsync and vsync signals, the stream mapper 330 is configured to associate a particular video stream with a particular display (e.g., by setting the value of a STRM field such as field 214 or field 224).

The lane-2 link layer 336 is arranged to generate signals (for example) adapted to control physical layer parameters for transmitting data on lane-2 in accordance with a system protocol. The lane-3 link layer 338 is arranged to generate signals (for example) adapted to control physical layer parameters for transmitting data across lane-3 in accordance with a system protocol.

Packets from a particular stream (e.g., Video In 7 stream) can be transmitted across either lane-2 or lane-3 in response to an assignment made by the transmission distributor (TX distributor) 344. The TX distributor 344 can allocate at least one transmission lane, so that pixels can be transmitted at a rate sufficient to fulfill frame rates of the display indicated by the STRM field. A first output of the TX distributor 344 is coupled to transfer lane-2 data to an input of the framer 356, and a second output of the TX distributor 344 is coupled to transfer lane-1 data to an input of the framer 358.

The framer 356 and framer 358 are adapted to generate transmission frames in accordance with a system protocol, such as a low-voltage differential-signaling (LVDS) protocol. The system protocol can be an LVDS standard, such as the fourth revision of the flat-panel display link (FPD) protocol. The FPD framer 366 is adapted to align data for transmission within a transmission frame, the FPD encoder 376 is adapted to encode the aligned data as symbols for transmission within the transmission frame, and the FPD frame physical aligner (FRAME PHY ALIGN) 386 is adapted to buffer the encoded symbols for synchronous transmission by transmitter 390 across lane-2. The FPD framer 368 is adapted to align data for transmission within a transmission frame, the FPD encoder 378 is adapted to encode the aligned data as symbols for transmission within the transmission frame, and the FPD frame physical aligner (FRAME PHY ALIGN) 388 is adapted to buffer the encoded symbols for synchronous transmission by transmitter 390 across lane-3.

Other video inputs (e.g., Video In 2 through Video In 6) and lane outputs (e.g., Lane-4 through Lane-15) and circuitry can be included, so that system bandwidth is sufficient to handle (for example) larger numbers of displays (e.g., for instrumentation, side and rear views, navigation, and infotainment systems for passengers) and/or increased resolutions. As described hereinbelow with reference to FIG. 4, the output (e.g., multistream output) is coupled to at least one stream disaggregator for coupling a selected video stream to the respective local display. A local display need not be coupled to any stream disaggregator, although cabling requirements (e.g., numbers of connectors, cables, and/or conductors) in systems with multiple displays and video streams are increased for cabling a local display not coupled to a stream disaggregator.

Figure 4:
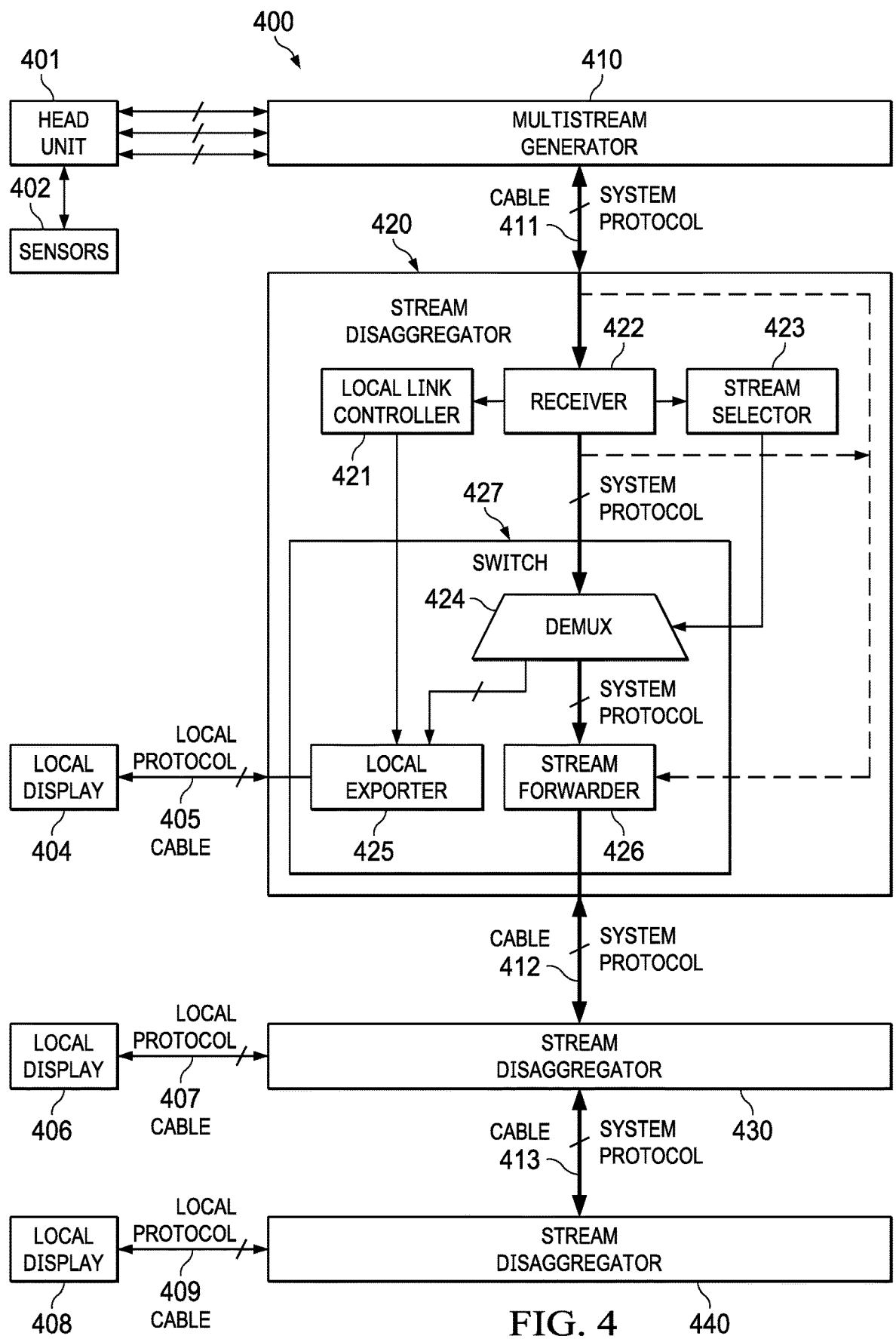
FIG. 4 is a block diagram of an example system that includes at least one stream disaggregator adapted to selectively forward transmissions between serially chained devices.

FIG. 4 is a block diagram of an example system that includes at least one stream disaggregator adapted to selectively forward transmissions between serially chained devices. For example, the system 400 is an example system that includes a head unit 401, a multistream generator 410, a stream disaggregator 420 (e.g., coupled locally to local display 404 via cable 405), a stream disaggregator 430 (e.g., coupled locally to local display 406 via cable 407), and a stream disaggregator 440 (e.g., coupled locally to local display 408 via cable 409). The stream disaggregators 420, 430, and 440 can be adapted transfer data bidirectionally (e.g., at 165 megabits per second upstream or at 13 gigabits per second downstream).

In an example, the head unit 401 is coupled to receive sensor information from sensors 402. The sensors 402 can be a suite of sensors associated with electronic systems of a vehicle (e.g., vehicle 110). Such sensors can include sensors adapted to sense positions of driver controls (e.g., gear shift, lights, steering wheel, turn signal lever, and other controls), vehicle attributes (e.g., speed, gas level, temperature, fuel flow, tire pressure, seat belts, and other attributes), and positioning (e.g., radar, satellite navigation, cameras, lane and curb sensors, and other relational information). The head unit 401 is adapted to generate output information (e.g., video information) in response to the sensor information. Additional head units 401 can be coupled various sensors 402 and the multistream generator 410.

The head unit 401 is adapted to generate video information for display on the local display 404 (e.g., which can be a CLUSTER 124), the local display 406 (e.g., which can be a heads-up display HUD 126), and the local display 408 (e.g., which can be a center-instrument display CID 128). For example, the head unit can generate: a first video stream of a vehicle dashboard in operation (e.g., for display on a display panel for replacing mechanical gauges); a second video stream for a HUD (e.g., to display navigation information on a virtual screen on a windshield); and a third video stream for a CID (e.g., to display real-time images from a rearward-facing backup camera). The head unit 401 is adapted to output the video streams as individual bit streams, for example.

The multistream generator 410 is a multistream generator such as the multistream generator 300, described hereinabove. The multistream generator 410 is coupled to the video outputs (e.g., each of the video outputs) of the head unit 401 and is adapted to combine independent video streams (e.g., of at least two) of the video streams received from the head unit 401 into a unified (e.g., multistream) video stream using a system protocol. The multistream generator is adapted to packetize information from the unified video stream (which includes information of at least two video streams, for example) and to transmit the unified video stream (multistream). Accordingly, the multistream generator is arranged as a source node of the unified video stream.

The individual packets (generated by the multistream generator) each include an identification field, such as a STRM identifier that can identify a selected display (e.g., addressed display and/or addressed node) as the destination of the packet. The multistream generator 410 is adapted to couple the encoded packets to a source output (e.g., of a source node) of the multistream generator 410. A first cable (411) is connected between the multistream generator 410 (e.g., source node) and a first stream disaggregator (e.g., stream disaggregator 420). The first cable includes conductors (and associated insulators/shielding) sufficient to carry information for all lanes (e.g., at least one lane) over which video information is transmitted.

The stream disaggregator 420 includes a local link controller 421, a stream input (such as receiver 422), a stream selector 423, a demultiplexer (DEMUX) 424, and a switch 427 (which includes a local exporter 425 and a stream forwarder 426). The receiver 422 can comprise a physical layer receiver, the local exporter 425 can comprise a physical layer driver, and the stream forwarder 426 can comprise a physical layer driver. The receiver 422 has a receiver output. The receiver 422 has a receiver input adapted to receive input data (e.g., the unified video stream) from an output of a source node (e.g., the multistream generator 410). The input data can be (and/or include) an incoming packet that includes an identification field, wherein the incoming packet is transmitted by the source node. The input data can be received as serial or parallel data. The input data is received in accordance with a system protocol (e.g., an FPD protocol) that is different from the local protocol (e.g., an eDP protocol, described hereinbelow).

The stream selector 423 includes a selector output. The stream selector 423 is coupled to a receiver output (e.g., of the receiver 422), and the stream selector 423 is configured to generate a destination indication at the selector output (e.g., of the stream selector 423). For example, the stream selector 423 is adapted to monitor the receiver 422 for received transmissions (e.g., packet 210 and packet 220) for STRM field contents (e.g., which can include functional data) and to program the demultiplexer (DEMUX) 424 in response. In an example, the stream selector 423 is adapted to generate the destination indication in response to the identification field (the stream selector 423 is optionally adapted to receive an identification field.

The switch 427 includes a switch local output and a switch system output. The switch 427 is coupled to the output of the receiver 422 (or optionally coupled to the input of the receiver 422) and is adapted to generate a transmission (e.g., output signal) at the switch local output (e.g., a first output of the switch) in response to an indication of the stream selector 423 output and the input data, and is adapted to generate a transmission at the switch system output in response to the input data. The switch local output is adapted to be coupled to a first destination node, and the switch system output is adapted to be coupled to a second destination node. For example, the switch 427 is adapted to generate, in response to the identification field, an output packet adapted to be transmitted at the switch local output (e.g., the local exporter 425) when, for example, the identification field indicates that the packet is to be exported to the local display 404. In one example, the switch 427 is adapted to route, in response to the destination indication, the input data to the switch system output (e.g., the stream forwarder 426) when, for example, the destination indication at the output of the stream selector 423 indicates that the packet is to be forwarded to another display (e.g., that the packet is not to be exported to the local display 404). In another example, the switch 427 forwards (e.g., transmits) all input data received by the stream disaggregator 420, where the input data is coupled from the receiver input 422 (where the coupling can include coupling the input data through the receiver 422 itself and the receiver 422 output), so that a transmission at the switch system output is generated by the switch 427 in response to the input data (e.g., irrespective of the stream field 214 and 224 contents).

The demultiplexer 424 includes a first output that is adapted to be coupled to a first destination node, and the demultiplexer 424 includes a second output that is adapted to be coupled to a second destination node. For example, the demultiplexer 424 includes a first output that is adapted to be coupled via the local exporter 425 to the local display 404. The first destination node is a local (e.g., local to the stream disaggregator 420 instance) node address that can be associated with at least one display node address. In the example, the demultiplexer 424 includes a second output that is adapted to be coupled via the stream forwarder 426, the cable 412, and the stream disaggregator 430 to the local display 406 (for example). The second destination node is a nonlocal node address can be associated with a display node address that indicates a node address other than a node address associated with the first destination node. The node addresses can be logical addresses of the various display nodes, whereas the stream field contents identify a particular video stream (which, for example, can be received selectively received by one or more displays having different logical addresses). A stream selector can be dynamically programmed (e.g., in response to a received control packet) to direct a selected video stream to the local display associated with the stream selector. The stream forwarder 426 is coupled to the switch system output, and the stream forwarder is adapted to transmit in accordance with the system protocol.

In an example, the demultiplexer 424 is adapted to couple (e.g., by switching), in response to the destination indication, the incoming packet to the first output of the switch and the second output of the switch. In an example, the demultiplexer 424 is adapted to generate, in response to the identification field, a packet at a selected one of the at least the first output of the switch and the second output of the switch. In an example, the demultiplexer 424 is adapted to generate a packet destination indication in response to an identification field of the incoming packet.

The local link controller is a local controller coupled to the switch local output, wherein the switch local output is adapted for transmitting to a display. The local link controller 421 is adapted to monitor the transmissions (e.g., packet 210 and packet 220) received by the receiver 422 for commands (e.g., functional data). The local link controller 421 is adapted to control a transmission of packets from the switch local output in accordance with a local protocol (e.g., which is a protocol that is different from the system protocol).

The local exporter 425 is coupled to the first output of the demultiplexer 424, wherein the local exporter 425 includes an exporter output adapted for coupling to a display. For example, the first output of the demultiplexer 424 is coupled to an input of the local exporter 425. An exporter output of the local exporter 425 can be coupled (e.g., connected) to the local display 404.

The output of the local exporter 425 includes a local protocol. In an example, the local protocol is a display port protocol such as the Video Electronics Association of America (VESA) embedded DisplayPort (eDP) standard. Accordingly, the input data can be received by the receiver 422 in accordance with a system protocol (e.g., FDP) that is different from at least one local protocol. Other display port protocols that can be supported as local protocols include: the DisplayPort (DP); the open liquid crystal display interface (OpenLDI); and the mobile industry processor interface (MIPI) display serial interface (DSI) and camera serial interface (CSI). A first local protocol (e.g., 405) of a first display (e.g., 404) can be a different protocol from a second local protocol (e.g., 407) of a second display (e.g., 406).

The stream disaggregator 420 can be programmed to operate in accordance with a protocol associated with the particular display locally coupled to the local exporter 425. For example, the multistream generator 410 can configure the stream disaggregator 420 by transmitting a start command to the local link controller 421 that includes an indication of the selected protocol. The indication of the selected protocol can be included within a stream_payload 212, for example. In an example system, a first stream disaggregator (e.g., 420) is adapted to select a first local protocol (e.g., 405) and a second stream disaggregator (e.g., 430) is adapted to select a second local protocol that is a different protocol from the first local protocol.

In an example system with two displays, a first cable (e.g. 411) is coupled between the output of the multistream generator 410 and the input of the first stream disaggregator 420, and a second cable (e.g., 412) is coupled between the second output of the first stream disaggregator 420 and the input of the second stream disaggregator 430. In the example system with two displays, received packets (e.g., encoded packets) of a first video stream are transmitted across the first cable (e.g., via a first switch local output) to the first display, and received packets (e.g., encoded packets) of a second video stream are transmitted across the first cable and the second cable (e.g., via a first switch system output and a second switch local output) to the second display.

In an example with at least two displays, the stream disaggregator 430 can include: a second receiver having a second receiver output, and having a second receiver input adapted to receive second input data from the first switch local output; a second selector having a second selector output, wherein the second selector is coupled to the second receiver, and wherein the second selector is configured to generate a second destination indication at the second selector output; and a second switch having a second switch local output and a second switch system output, wherein the second switch is coupled to the second receiver, and wherein the second switch is adapted to generate a transmission at the second switch local output in response to an indication of the second selector output and the second input data, wherein the second switch is adapted to generate a transmission at the second switch system output in response to the second input data.

In the example system with at least two displays, the stream disaggregator 430 can further include: comprising a second local controller coupled to the second switch local output, wherein the second switch local output is adapted for transmitting to a second display, and wherein the second local exporter is arranged to transmit data to the second display in response to a start command of a packet that includes the second destination indication as indicating the second display.

In another example system with at least two displays: a head unit is adapted to generate at least two video streams at an output of the head unit; and a multistream generator is coupled to the output of the head unit and is adapted to generate encoded packets that include information from the at least two video streams and to transmit the encoded packets to the source output, wherein the input data includes a packet from one of the at least two video streams. The encoded packets can be encoded by an encoder such as FDP encoder 372, 374, 376, and 378, and the encoded packets can be decoded by a receiver (e.g., receiver 422 of a downstream stream disaggregator, for example).

In an example system with at least two displays, the system includes: a head unit adapted to generate at least two video streams; a multistream generator coupled to the head unit, and adapted to generate encoded packets that comprise an identification field and that include information from the at least two video streams, and to couple the encoded packets to an output of the multistream generator; a first stream disaggregator having a first stream input coupled to the output of the multistream generator, the first stream disaggregator having a first output adapted to couple in accordance with a first local protocol a received encoded packet to a first display in response to an identification field of the received encoded packet indicating a node address of the first display, and the first stream disaggregator having a second output adapted to forward the received encoded packet in response to the identification field of the received encoded packet indicating a node address of other than a first display; and a second stream disaggregator having a second stream input coupled to the second output of the first stream disaggregator, the second stream disaggregator having a first output adapted to couple in accordance with a second local protocol the received encoded packet to a second display in response to an identification field of the received encoded packet indicating a second display node, and the second stream disaggregator having a second output adapted to forward the received encoded packet in response to an identification field of the received encoded packet indicating a node address other than a second display node address. The example system can further comprise: a third stream disaggregator having a third stream input coupled to the second output of the second stream disaggregator, the third stream disaggregator having a first output adapted to couple the received encoded packet to a third display in response to an identification field of the received encoded packet indicating a third display node address, and the third stream disaggregator having a second output adapted to forward the received encoded packet in response to an identification field of the received encoded packet indicating a node address other than a third display node address. The example system can further comprise: a first cable coupled between the output of the multistream generator and the first stream input; and a second cable coupled between the second output of the first stream disaggregator and the second stream disaggregator, wherein encoded packets of a first video stream are transmitted across the first cable to the first display, and wherein encoded packets of a second video stream are transmitted across the first cable and the second cable to the second display. In the example system, the first local protocol can be a different protocol from the second local protocol.

An example method for networking a multiple display system can include operations such as: transmitting, to a first display in response to an identification field of the received encoded packet indicating a node address of the first display, a first transmission including information of a received encoded packet; forwarding, in response to the identification field of the received encoded packet indicating a node address other than a first display node address, a second transmission including information of the received encoded packet; transmitting, to a second display in response to an identification field of the received encoded packet indicating a second display, a third transmission including information of the received encoded packet; and forwarding, in response to an identification field of the received encoded packet indicating a node address other than a second display node address, a fourth transmission including information of the received encoded packet. When the received encoded packet is a first encoded packet, the example method can further include: generating the first encoded packet in response to information received from a first video stream, and generating a second encoded packet in response to information received from a second video stream; transmitting the first encoded packet of the first video stream across a first cable to the first display; and transmitting the second encoded packet of the second video stream across the first cable and a second cable to the second display. The example method can further include: generating the first video stream in response to sensors of a vehicle that includes the first and second displays.

In an example system with three displays, a first cable (e.g. 411) is coupled between the output of the multistream generator 410 and the input of the first stream disaggregator 420, a second cable (e.g., 412) is coupled between the second output of the first stream disaggregator 420 and the input of the second stream disaggregator 430, and a third cable (e.g., 413) is coupled between the second output of the second stream disaggregator 430 and the input of the third stream disaggregator 440. In the example system with three displays, received encoded packets of a first video stream are transmitted across the first cable (e.g., via a first switch local output) to the first display, received encoded packets of a second video stream are transmitted across the first cable and the second cable (e.g., via a first switch system output and a second switch local output) to the second display, and received encoded packets of a third video stream are transmitted across the first cable, the second cable, and the third cable (e.g., via a first switch system output, a second switch system output and a third switch local output) to the third display.

In accordance with the examples described herein, additional displays and video streams can be added to a multiple display unit without (for example) increasing the number of cables connected to (e.g., physically connected to) the head unit 401 and/or the multistream generator 410.

Figure 5:
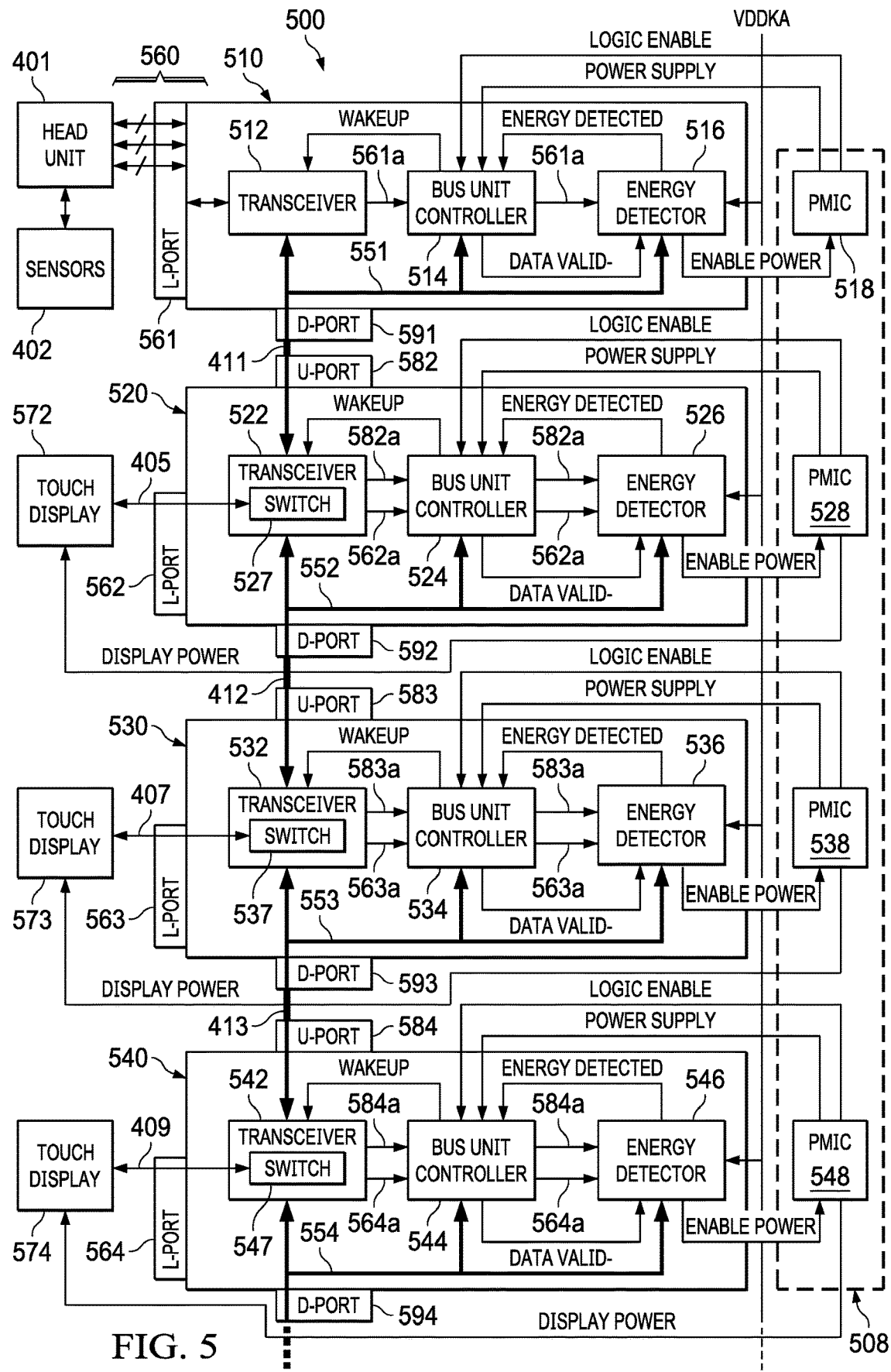
FIG. 5 is a block diagram of an example system that includes at least one bus unit adapted to generate and forward system wakeup signals between serially chained bus units.

FIG. 5 is a block diagram of an example system that includes at least one bus unit adapted to generate and forward system wakeup signals between serially chained bus units. For example, the system 500 is an example system that includes a head unit 401 (e.g., coupled to sensors 402), a first bus unit 510 (e.g., coupled locally to the head unit 401 via a local port 561 and cable(s) 560), a second bus unit 520 (e.g., coupled locally to the touch display 572 via a local port 562 and cable 405), a third bus unit 530 (e.g., coupled locally to the touch display 573 via a local port 563 and cable 407), and a fourth bus unit 540 (e.g., coupled locally to the touch display 574 via a local port 564 and cable 409). The bus units 510, 520, 530, and 540 can be adapted transfer data bidirectionally (e.g., at 165 megabits per second upstream or at 13 gigabits per second downstream). The bus units 520, 530, and 540 can be serializers and/or deserializers (e.g., SERDES) and/or disaggregators (such as 420, 430, and 440 respectively).

In an example wakeup sequence generally described herein following, the second bus unit 520 can be configured in an active mode (e.g., awakened) from a power conservation mode by a local wakeup signal generated in response to a wakeup event detected at the touch display 572. In response to the local wakeup signal, the second bus unit 520 can generate and transmit a system wakeup signal to the first bus unit 510 (e.g., so that the system wakeup signal is transmitted in an upstream direction and the first bus unit 510 is awakened in response). Similarly, the second bus unit 520 can generate and transmit a system wakeup signal to the third bus unit 530 (e.g., so that the system wakeup signal is transmitted in a downstream direction and the third bus unit 530 awakened in response). In the example, the third bus unit 530 in response to receiving a system wakeup signal can generate a subsequent wakeup signal and transmit the wakeup signal to the fourth bus unit 540 (e.g., so that the system wakeup signal is transmitted in a downstream direction and the third bus unit 530 awakened in response). Other wakeup sequences are described hereinbelow (e.g., with respect to FIG. 8, FIG. 9, and FIG. 10).

In a first example system, the system 500 includes a first bus unit (FBU) 510 having an FBU first system port (e.g., downstream D-port 591), an FBU local port (e.g., local L-port 561), an FBU wakeup input, an FBU transceiver 512, an FBU controller 514, and an FBU energy detector 516. The FBU transceiver 512 is coupled to the FBU first system port, the FBU local port and the FBU wakeup input.

The FBU first system port (e.g., 591) is adapted to receive an FBU first system input signal. The FBU local port (e.g., 561) is adapted to receive an FBU local input signal. The FBU transceiver 512 is configured to transfer data of the FBU first system input signal to the FBU local port (e.g., 561) in an FBU first mode (e.g., active mode). The FBU transceiver 512 is configured to conserve power in an FBU second mode. The FBU transceiver 512 is configured to enter the FBU first mode in response to an FBU local wakeup signal. The FBU transceiver 512 is configured to transmit an FBU system wakeup signal at one of the FBU first system port (e.g., 591) and the FBU local port (e.g., 561) in response to the FBU local wakeup signal.

The FBU controller 514 has an FBU energy detected input and an FBU wakeup output, the FBU wakeup output being coupled to the FBU wakeup input. The FBU controller 514 is configured to generate the FBU local wakeup signal at the FBU wakeup output in response to an FBU energy detected signal.

The FBU energy detector 516 has an FBU energy detected output coupled to the FBU energy detected input. The FBU energy detector 516 is coupled to the FBU first system port (e.g., via bus 551) and the FBU local port (e.g., via node 561a). The FBU energy detector 516 is configured to generate the FBU energy detected signal at the FBU energy detected output in response to an FBU detection of energy of one of the FBU first system input signal (e.g., via node 561a) and the FBU local input signal received by the FBU transceiver 512 in the FBU second mode.

In the first example system, the system 500 further includes a second bus unit (SBU) 520 having an SBU first system port (e.g., upstream U-port 582). The SBU first system port is coupled to the FBU first system port (e.g., downstream D-port 591). The SBU first system port (e.g., 582) is adapted to receive the FBU system wakeup signal and the FBU first system port (e.g., 591) is adapted to receive the SBU system wakeup signal (e.g., if transmitted via the SBU first system port by the SBU 520).

The SBU 520 can further comprise an SBU second system port (e.g., downstream D-port 592), an SBU local port (e.g., local L-port 562), an SBU wakeup input, an SBU transceiver 522, an SBU controller 524, and an SBU energy detector 526. The SBU transceiver 522 is coupled to the SBU first system port, the SBU second system port, the SBU local port and the SBU wakeup input.

The SBU first system port (e.g., 582) is adapted to receive an SBU first system input signal, the SBU second system port (e.g., 592) is adapted to receive an SBU second system input signal, and the SBU local port (e.g., 562) is adapted to receive an SBU local input signal. The SBU transceiver 522 is configured to transfer data of the SBU first system input signal to the SBU second system port (e.g., 592) in an SBU first mode (e.g., active mode), and the SBU transceiver 522 is configured to conserve power in an SBU second mode (e.g., power conservation mode). The SBU transceiver 522 is configured to enter the SBU first mode in response to an SBU local wakeup signal. The SBU transceiver 522 is configured to transmit an SBU system wakeup signal at one of the SBU first system port and the SBU second system port in response to the SBU local wakeup signal.

Generally, the SBU 520 can detect a wakeup signal at any of the first system port (e.g., 582), the SBU second system port (e.g., 592), and the SBU local port (e.g., 562). The SBU 520 is configured (in response to a detected wakeup signal) to generate a subsequent wakeup signal to be transmitted to the ports from which the detected wakeup signal was received. In a first scenario, a wakeup signal is detected via the SBU local port (e.g., 562) and in response the SBU transceiver 522 transmits a system wakeup signal via the SBU first system port (e.g., 582) and via the SBU second system port (e.g., 592). In a second scenario, a wakeup signal is detected via the SBU first system port (e.g., 582) and in response the SBU transceiver 522 transmits a system wakeup signal via the SBU second system port (e.g., 592) and transmits a local wakeup signal via the SBU local port (e.g., 562). In a third scenario, a wakeup signal is detected via the SBU second system port (e.g., 592) and in response the SBU transceiver 522 transmits a system wakeup signal via the SBU first system port (e.g., 582) and transmits a local wakeup signal via the SBU local port (e.g., 562). Transmitting a local wakeup signal to the touch display 572 in response to the SBU 522 receiving a system wakeup signal from one of the FBU 510 or the third bus unit 530 can signal the touch display to transition from a power conservation mode to an active mode.

The SBU controller 524 has an SBU energy detected input and an SBU wakeup output, the SBU wakeup output being coupled to the SBU wakeup input. The SBU controller 524 is configured to generate the SBU local wakeup signal at the SBU wakeup output in response to an SBU energy detected signal.

The SBU energy detector 526 has an SBU energy detected output that is coupled to the SBU energy detected input. The SBU energy detector 526 is coupled to the SBU first system port (e.g., 582), the SBU second system port (e.g., 592) and the SBU local port (e.g., 562). The SBU energy detector 526 is configured to generate the SBU energy detected signal at the SBU energy detected output in response to an SBU detection of energy of one of the SBU first system input signal (e.g., via node 582*a*), the SBU second system input signal (e.g., via bus 552), and the SBU local input signal (e.g., via node 562*a*) received by the SBU transceiver 522 in the SBU second mode.

In the first example system, the system 500 further includes a third bus unit (TBU) 530 having a TBU first system port (e.g., upstream U-port 583), an optional TBU second system port (e.g., downstream D-port 593), a TBU local port (e.g., local L-port 563), a TBU wakeup input, a TBU transceiver 532, a TBU controller 534, and a TBU energy detector 536. The TBU first system port (e.g., 583) is coupled to the SBU second system port (e.g., 592). The TBU transceiver 532 is coupled to the TBU first system port, the optional TBU second system port, the TBU local port and the TBU wakeup input.

The TBU first system port (e.g., 583) is adapted to receive a TBU first system input signal, the optional TBU second system port (e.g., 593) can be adapted to receive a TBU second system input signal, and the TBU local port (e.g., 563) is adapted to receive a TBU local input signal. The TBU transceiver 532 is configured to transfer data of the TBU first system input signal to one of the TBU local port (e.g., 563) and the TBU second system port (e.g., 593) in a TBU first mode (e.g., active mode), and the TBU transceiver 532 is configured to conserve power in a TBU second mode (e.g., power conservation mode). The TBU transceiver 532 is configured to enter the TBU first mode in response to a TBU local wakeup signal. The TBU transceiver 532 is configured to transmit a TBU system wakeup signal at one of the TBU first system port and the TBU local port in response to the TBU local wakeup signal. The SBU second system port (e.g., 592) is adapted to receive the TBU system wakeup signal (e.g., in response to the TBU system wakeup signal being transmitted via the TBU first system port by the TBU 530).

Generally, the TBU 530 can detect a wakeup signal at any of the first system port (e.g., 583), the TBU second system port (e.g., 593), and the TBU local port (e.g., 563). The TBU 530 is configured (in response to a detected wakeup signal) to generate a subsequent wakeup signal to be transmitted to the ports from which the detected wakeup signal was received. In a first scenario, a wakeup signal is detected via the TBU local port (e.g., 563) and in response the TBU transceiver 532 transmits a system wakeup signal via the TBU first system port (e.g., 583) and via the TBU second system port (e.g., 593). In a second scenario, a wakeup signal is detected via the TBU first system port (e.g., 583) and in response the TBU transceiver 532 transmits a system wakeup signal via the TBU second system port (e.g., 593) and transmits a local wakeup signal via the TBU local port (e.g., 563). In a third scenario, a wakeup signal is detected via the TBU second system port (e.g., 593) and in response the TBU transceiver 532 transmits a system wakeup signal via the TBU first system port (e.g., 583) and transmits a local wakeup signal via the TBU local port (e.g., 563). Transmitting a local wakeup signal to the touch display 573 in response to the TBU 532 receiving a system wakeup signal from one of the SBU 510 or the third bus unit 530 can signal (e.g., command) the touch display to transition from a power conservation mode to an active mode.

The TBU controller 534 has a TBU energy detected input and a TBU wakeup output, the TBU wakeup output being coupled to the TBU wakeup input. The TBU controller 534 is configured to generate the TBU wakeup signal at the TBU wakeup output in response to a TBU energy detected signal.

The TBU energy detector 536 has a TBU energy detected output that is coupled to the TBU energy detected input. The TBU energy detector 536 is coupled to the TBU first system port (e.g., 583), the TBU second system port (e.g., 593) and the TBU local port (e.g., 563). The TBU energy detector 536 is configured to generate the TBU energy detected signal at the TBU energy detected output in response to a TBU detection of energy of one of the TBU first system input signal (e.g., via node 583*a*), the optional TBU second system input signal (e.g., via bus 553), and the TBU local input signal (e.g., via node 563*a*) received by the TBU transceiver 532 in the TBU second mode.

In the first example system, the system 500 can further includes additional (e.g., optional) bus units for extending the serially chained system bus. For example, the forth bus unit 540 has a first system port (e.g., upstream U-port 584), a second system port (e.g., downstream D-port 594), a local port (e.g., local L-port 564), a wakeup input, a transceiver 542, a controller 544, and an energy detector 546. The first system port (e.g., 584) is coupled to the TBU second system port (e.g., 593).

The first system port (e.g., 584) is adapted to receive a first system input signal, the optional second system port (e.g., 594) can be adapted to receive a second system input signal, and the local port (e.g., 564) is adapted to receive a local input signal. The transceiver 542 is configured to transfer data of the first system input signal to one of the local port (e.g., 564) and the second system port (e.g., 594) in a first mode (e.g., active mode), and the transceiver 542 is configured to conserve power in a second mode (e.g., power conservation mode). The transceiver 542 is configured to enter the first mode in response to a local wakeup signal. The transceiver 542 is configured to transmit a system wakeup signal at one of the first system port and the local port in response to the local wakeup signal. The TBU second system port (e.g., 593) is adapted to receive the fourth bus unit-generated system wakeup signal (e.g., in response to the fourth bus unit system wakeup signal being transmitted via the fourth bus unit first system port by the fourth bus unit 540.

The controller 544 has an energy detected input and a wakeup output, the wakeup output being coupled to the wakeup input. The controller 544 is configured to generate the local wakeup signal at the wakeup output in response to an energy detected signal.

The energy detector 546 has an energy detected output that is coupled to the energy detected input. The energy detector 546 is coupled to the first system port (e.g., 584), the second system port (e.g., 594) and the local port (e.g., 564). The energy detector 546 is configured to generate the energy detected signal at the energy detected output in response to a detection of energy of one of the first system input signal (e.g., via node 584*a*), the optional second system input signal (e.g., via bus 554), and the local input signal (e.g., via node 564*a*) received by the transceiver 542 in the second mode.

In the first example system, the system 500 further includes a user interface (UI) device, such as one of the touch displays 572, 573, and 574. The touch display 572 is coupled to a switch 527 (e.g., similar to switch 427) of transceiver 522 of the SBU 520 via cable 405 and local port 562, the touch display 573 is coupled to a switch 537 (e.g., similar to switch 437) of transceiver 532 of the TBU 530 via cable 407 and local port 563, and the touch display 574 is coupled to a switch 547 (e.g., similar to switch 447) of transceiver 542 of a fourth bus unit 540 via cable 409 and local port 564.

With respect to the FBU 510, a UI device (e.g., sensors 402 and head unit 401) includes a UI port (e.g., 560) coupled to the FBU local port (561), where the UI device is adapted to receive a user input (such as a user touch, user voice, user manipulation, proximity detection, and physical or electronic indications). The FBU 510 is configured to generate a user wakeup signal at the UI port in response to the user input. The FBU 510 is configured to generate the SBU system wakeup signal in response to the user wakeup signal. The SBU 520 is configured to generate the SBU local wakeup signal in response to the FBU system wakeup signal.

With respect to the SBU 520, a UI device (e.g., touch display 572) includes a UI port (e.g., 405) coupled to the SBU local port (562), where the UI device is adapted to receive a user input. The SBU 520 is configured to generate a user wakeup signal at the UI port in response to the user input. The SBU 520 is configured to generate the SBU system wakeup signal in response to the user wakeup signal. The FBU 510 is configured to generate the FBU local wakeup signal in response to the SBU system wakeup signal, and the TBU 530 is configured to generate the FBU local wakeup signal in response to the SBU system wakeup signal.

With respect to the TBU 530, a UI device (e.g., touch display 573) includes a UI port (e.g., 407) coupled to the TBU local port (563), where the UI device is adapted to receive a user input. The TBU 530 is configured to generate a user wakeup signal at the UI port in response to the user input. The TBU 530 is configured to generate the TBU system wakeup signal in response to the user wakeup signal. The SBU 520 is configured to generate the SBU local wakeup signal in response to the TBU system wakeup signal, and the fourth bus unit 540 is configured to generate a fourth bus unit local wakeup signal in response to the TBU system wakeup signal.

With respect to the fourth bus unit 540, a UI device (e.g., touch display 574) includes a UI port (e.g., 409) coupled to the fourth bus unit local port (564), where the UI device is adapted to receive a user input. The fourth bus unit 540 is configured to generate a user wakeup signal at the UI port in response to the user input. The fourth bus unit 540 is configured to generate the fourth bus unit system wakeup signal in response to the user wakeup signal. The TBU 530 is configured to generate the TBU local wakeup signal in response to the fourth bus unit system wakeup signal, and any serially chained additional bus unit is configured to generate a respective unit local wakeup signal in response to the system wakeup signal of an adjacent serially chained bus unit.

In a second example system, the system 500 includes a power management system 508. The power management system 508 includes power managers such as a PMIC (power manager integrated circuit) 518 coupled to the FBU 510, a PMIC 528 coupled to the SBU 520, a PMIC 538 coupled to the TBU 520, and a PMIC 548 coupled to the fourth bus unit 540. The PMIC 518, PMIC 528, the PMIC 538, and the PMIC 548 can be included on a common substrate, can be included on a substrate that includes the bus unit to which a respective PMIC is coupled, and/or combinations thereof. Power for operating controls, for example, of the power manager and energy detection circuitry can be provided (e.g., coupled) via the VDDKA (first power rail keep-alive) power signal (e.g., which allows a reduced consumption of power in a power conservation mode).

In a second example system, the system 500 includes a circuit (such as SBU 520) that includes a transceiver (e.g., 522), a controller (e.g., 524), and an energy detector (e.g., 526).

The transceiver (e.g., 522) has a first system port (e.g., a first selected one of 582 and 592), a second system port (e.g., a second selected one of 582 and 592 that is different from the first selected one of 582 and 592), a local port (e.g., 562) and a wakeup input. The first system port is adapted to receive a first system input signal, the second system port is adapted to receive a second system input signal, and the local port is adapted to receive a local input signal. The transceiver is configured to transfer data of the first system input signal to the second system port in a first mode, the transceiver is configured to conserve power in a second mode, the transceiver is configured to enter the first mode in response to a local wakeup signal, and the transceiver is configured to transmit a system wakeup signal at the second system port in response to the local wakeup signal.

The controller (e.g., 524) has an energy detected input and a wakeup output, the wakeup output coupled to the wakeup input. The controller is configured to generate the local wakeup signal at the wakeup output in response to an energy detected signal.

The energy detector (e.g., 526) has an energy detected output coupled to the energy detected input. The energy detector is coupled to the first system port and the local port. The energy detector is configured to generate the energy detected signal at the energy detected output in response to a detection of energy of one of the first system input signal and the local input signal received by the transceiver in the second mode.

In an example, the transceiver is further configured to transfer data of the second system input signal to the first system port in the first mode. In the example, the system wakeup signal can include a wakeup pattern.

In another example, the transceiver is further configured to transmit the system wakeup signal at the first system port in response to the local wakeup signal in the second mode.

In yet another example, the energy detector is configured to detect energy of one of the first system input signal and the local input signal. In the example, the energy detector can be coupled to the second system port and the energy detector can be configured to detect energy of the second system input signal. In the example, the energy detector is configured to generate the energy detected signal at the energy detected output in response to a detection of energy of the second system input signal received by the transceiver in the second mode.

In a further example, the controller is further coupled to the first system port and the local port. The controller is further configured to detect a wakeup pattern in one of the first system input signal and the local input signal responsive to the energy detected signal. In the example, the controller can further comprise a data valid output, where the controller is configured to generate a data valid signal at the data valid output responsive to a detection of a wakeup pattern in one of the first system input signal and the local input signal. In the example, the energy detector can further include a data valid input and an enable power output, where the data valid input is coupled to the data valid output, and the energy detector further configured to generate an enable power signal at the enable power output. In the example, the circuit can further comprise a power manager, where the power manager includes an enable power input and a power supply output, where the enable power input is coupled to the enabled power output, and the power manager is configured to generate a power signal at the power supply output responsive to the enable power signal. In the example, the controller further comprises a power supply input, where the power supply input is coupled to the power supply output, and the controller is further configured to generate the local wakeup signal responsive to the power signal. In the example system, the circuit the power manager can further comprise a logic enable output and the controller can further comprises a logic enable input, where the logic enable input is coupled to the logic enable output, where the power manager can be further configured to generate the logic enable signal at the logic enable output responsive to the power signal, and the controller can be further responsive to generate the local wakeup signal responsive to the logic enable signal.

Figure 6:
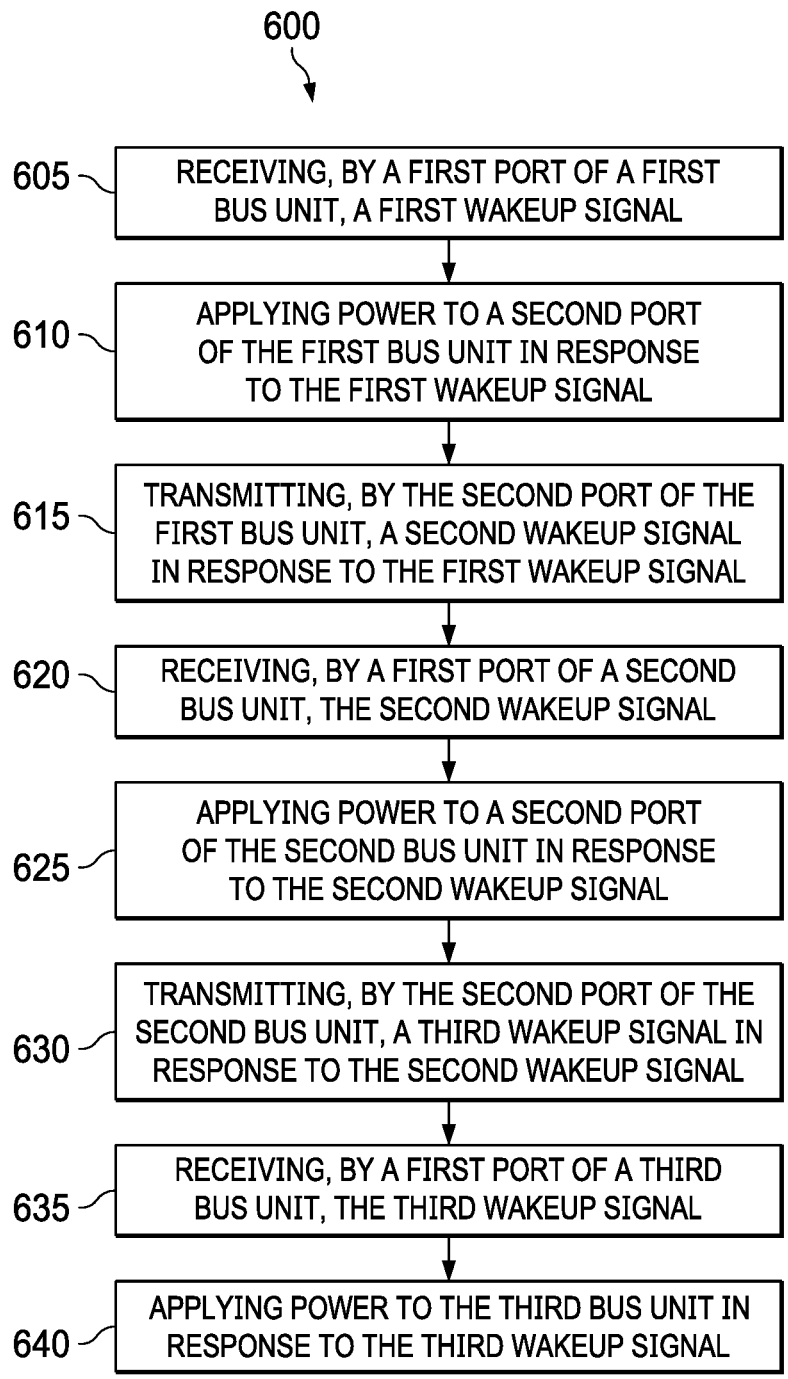
FIG. 6 is a flow diagram of an example method of wakeup signal promulgation of the example system of FIG. 5.

FIG. 6 is a flow diagram of an example method of wakeup signal promulgation of the example system of FIG. 5. The example method 600, can include various techniques described herein following. In various implementations, the described operations need not be performed in the described order. In the example method 600, the method can be initiated at 605.

At 605, the method can include receiving, by a first port of a first bus unit (FBU), a first wakeup signal. For example, a first wakeup signal can be generated by a head unit 401 responsive to sensors 502. The first wakeup signal can be received by the FBU 510 at the local port 561. The method can continue at 610.

At 610, the method can include applying power to a second port of the FBU in response to the first wakeup signal. For example, power management circuitry such as PMIC 518 can couple operating power to a transmitter (e.g., of transceiver 512) so that the transmitter can exit a power conservation mode and enter an active mode (e.g., in which a signal can be transmitted). In an example, the power can be coupled by energizing a power supply. In another example, a system clock is activated (e.g., promulgated) so that additional power is drawn in response to the switching of active CMOS circuitry being switched by the activated system clock. In an implementation, an entire bus unit can be placed in an active mode by applying power to all bus unit active circuitry responsive to a received wakeup signal. The method can continue at 615.

At 615, the method can include transmitting, by the second port of the FBU, a second wakeup signal in response to the first wakeup signal. For example, a transmitter portion of the transceiver 512 can transmit the second wakeup signal from a second port (e.g., the first system port 591). The method can continue at 620.

At 620, the method can include receiving, by a first port of a second bus unit (SBU), the second wakeup signal. For example, the second wakeup signal can be generated by the FBU 510 responsive to the first wakeup signal. The second wakeup signal can be received by the SBU 520 at the first system port 582. The method can continue at 625.

At 625, the method can include applying power to a second port of the SBU in response to the second wakeup signal. For example, power management circuitry such as PMIC 528 can couple operating power to a transmitter (e.g., of transceiver 522) so that the transmitter can exit a power conservation mode and enter an active mode (e.g., in which a signal can be transmitted). The method can continue at 630.

At 630, the method can include transmitting, by the second port of the SBU, a third wakeup signal in response to the second wakeup signal. For example, a transmitter portion of the transceiver 522 can transmit the third wakeup signal from a second port (e.g., the second system port 592). A transmitter portion of the transceiver 522 can optionally send, in response to the second wakeup signal, a local wakeup signal from a third port (e.g., 562) to a locally coupled device (e.g., touch display 572). The method can continue at 635.

At 635, the method can include receiving, by a first port of a third bus unit (TBU), the third wakeup signal. For example, the third wakeup signal can be generated by the SBU 520 responsive to the second wakeup signal. The third wakeup signal can be received by the TBU 530 at the first system port 582. The method can continue at 625.

At 640, the method can include applying power to the TBU in response to the third wakeup signal. For example, power management circuitry such as PMIC 538 can couple operating power to the TBU 530 so that the TBU 530 can exit a power conservation mode and enter an active mode (e.g., in which signals can be actively received and transmitted). Accordingly, a local wakeup event can be promulgated across and through a serial chain of bus units in the system 500 described herein.

Figure 7:
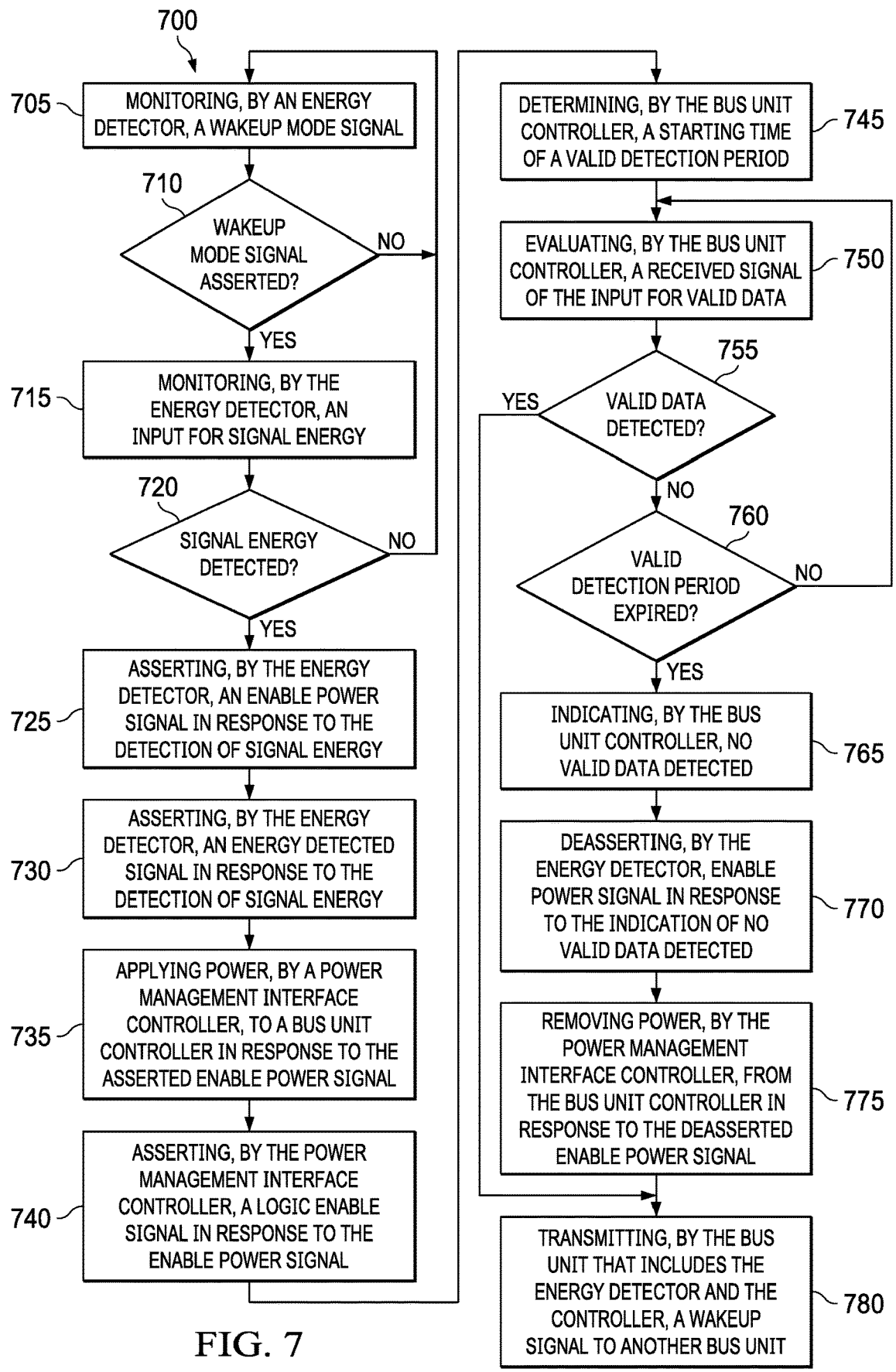
FIG. 7 is a flow diagram of an example method wakeup signal detection and wakeup signal handling of the example system of FIG. 5.

FIG. 7 is a flow diagram of an example method wakeup signal detection and wakeup signal handling of the example system of FIG. 5. The example method 700, can include various techniques described herein following. In various implementations, the described operations need not be performed in the described order. In the example method 700, the method can be initiated at 705.

At 705, the method can include monitoring, by an energy detector (e.g., 526), a wakeup mode signal. For example, the wakeup mode signal can be the VDDKA signal, which can supply operating power to an energy detector of a bus unit. The method can continue at 710.

At 710, the method continues at 715 if the wakeup mode signal is asserted; if not, the method continues at 705.

At 715, the method can include monitoring, by the energy detector (e.g., 526), an input signal for signal energy. For example, the energy detector of a bus unit can compare a field strength, current, and/or voltage level carried by an electrical conductor against a threshold to detect a quantized change in the input signal. The signal net (e.g., signal line) can be a dedicated wakeup signal conductor or can be used for other purposes (e.g., a signal lane for receiving video stream information from an upstream source) while the bus unit is operating in an active mode. The method continues at 720.

At 720, the method continues at 725 if signal energy is detected; if not, the method continues at 705.

At 725, the method can include asserting, by the energy detector (e.g., 526), an enable power signal in response to the detection of signal energy. The method continues at 730.

At 730, the method can include asserting, by the energy detector (e.g., 526), an energy detected signal in response to the detection of signal energy. The method continues at 735.

At 735, the method can include applying power, by a power management interface controller (e.g., 528), to a controller (e.g., 524) of the bus unit in response in response to the asserted enable power signal. The method continues at 740.

At 740, the method can include asserting, by the power management interface controller (e.g., 528), a logic enable signal in response in response to the enable power signal. For example, the logic enable signal can be asserted after a duration in which logic circuits of the controller can stabilize after an application of power. The method continues at 745.

At 745, the method can include determining, by the controller (e.g., 524), a starting time of a valid detection period. For example, the controller, responsive to the logic enable signal, can determine a start time (e.g., start a timer) of a valid detection period during which the input signal (e.g., a potential wakeup signal) is evaluated for valid data (e.g., a wakeup pattern). The method continues at 750.

At 750, the method can include evaluating, by the controller (e.g., 524) of the bus unit, a received signal of the input signal for valid data. For example, the input signal can be evaluated to determine the presence of a wakeup pattern. The valid data can also include a wakeup code configured to identify the bus unit from which the wakeup signal in the input signal was received. The wakeup pattern can be encoded to decrease entropy (e.g., to reduce false positives resulting from injected noise). The method continues at 755.

At 755, the method continues at 780 if valid data is detected; if not, the method continues at 760.

At 760, the method continues at 765 if the valid detection period has expired (e.g., has been exceeded); if not, the method continues at 750.

At 765, the method can include indicating, by the controller (e.g., 524) of the bus unit, that no valid data has been detected. The method continues at 770.

At 770, the method can include de-asserting, by the energy detector (e.g., 526), the enable power signal in response to the indication of no valid data being detected. For example, the enable power signal can be de-asserted by negating an active-low signal (e.g., valid data-) that, when active-low, indicates that valid data has been detected. The method continues at 775.

At 775, the method can include removing power, by the power management interface controller (e.g., 528), from the controller (e.g., 524) of the bus unit in response to the de-asserted enable power signal. The method continues at 705.

At 780, the method can include transmitting, by the bus unit (e.g., bus unit 520, which is a first bus unit that includes the energy detector 526 and the controller 524), a wakeup signal (e.g., a second wakeup signal) to another bus unit (e.g., a second bus unit such as bus unit 510 and/or 530). For example, the first bus unit can send the second wakeup signal to the second bus unit, where the second wakeup signal is encoded with an identifier of the first bus unit, and where the second bus unit is not the bus unit from which the first wakeup signal was sent. The wakeup signal can include a repeating pattern, so that the wakeup signal can be transmitted (e.g., repeatedly transmitted) over a valid detection period. The length (e.g., duration) of the valid detection period can be selected for a respective bus unit. In an example, a wake pattern includes three start bits "101," four address bits "0010" (which indicate the bus unit 520), and an even parity bit "1", so that the transmitted wake pattern is a repeatable pattern of the eight bits "10100101." When a received pattern does not include a correct parity bit and does not include the start bits "101," the data valid signal is deasserted (e.g., set high) by the controller 524 to indicate the received wake pattern is not valid, so that the energy detector 526 does not assert the enable power signal in response to the invalid wake pattern.

Figure 8:
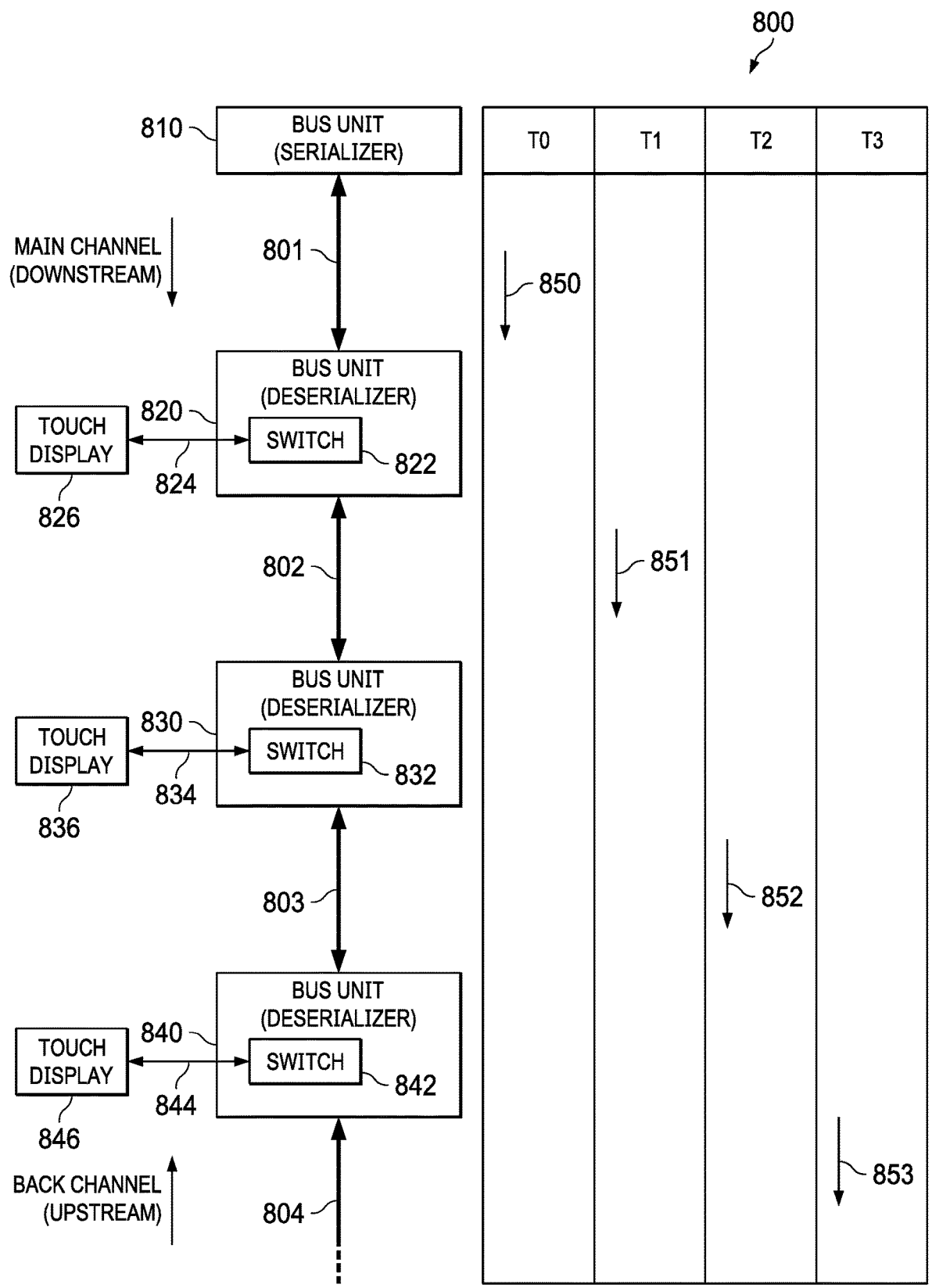
FIG. 8 is a block diagram of a first example wakeup signal handling scenario in an example system.

FIG. 8 is a block diagram of a first example wakeup signal handling scenario in an example system. In the example, the system 800 includes serially chained bus units such as 810, 820, 830, and 840. The bus units can be deserializers (which can include both serializing circuits and deserializing circuits per se) and/or disaggregators (described hereinabove with respect to FIG. 4).

The FBU 810 can be similar to the multistream generator 410 and/or FBU 510. The FBU 810 can be locally coupled to various devices (e.g., sensors 402 and head unit 401), which can generate a local wakeup signal in response to input generated by any coupled sensor. The FBU 810 is upstream (e.g., relative to a direction of a majority of video stream flows in a system bus main channel) of the SBU 820. The FBU 810 is coupled to the SBU 820 via a cable 801. The cable 801 (and each of the cables 802, 803, and 804) can be a cable harness that includes conductor(s) (e.g., twisted pair, coax, or optical fiber) for sending and/or receiving wakeup signals. In some examples, conductors reserved as "lanes" for video streaming in an active mode can be used to transmit a wakeup signal to an adjacent bus unit that is in a power conservation mode.

The FBU 810 is coupled to the second bus unit (SBU) 820 via cable 801. The SBU 820 is locally coupled via cable 824 to the touch display 826 (which can be similar to touch display 572), where the SBU 820 is configured to disaggregate (by switch 822) a video in active mode and send a disaggregated stream to the touch display 826. The SBU 820 is coupled to the third bus unit (TBU) 830 via cable 802. The TBU 830 is locally coupled via cable 834 to the touch display 836 (which can be similar to touch display 573), where the TBU 830 is configured to disaggregate (by switch 832) a video in active mode and send a disaggregated stream to the touch display 836. The TBU 830 is coupled to the fourth bus unit 840 via cable 803. The fourth bus unit 840 is locally coupled via cable 844 to the touch display 846 (which can be similar to touch display 574), where the fourth bus unit 840 is configured to disaggregate (by switch 842) a video in active mode and send a disaggregated stream to the touch display 846. The fourth bus unit 840 can be coupled to an adjacent (e.g., downstream) bus unit via a cable 804 (where even more downstream bus units can be serially chained in along a system bus, where each of the additional downstream units can be locally coupled with similar circuits).

In the first example scenario, a first bus unit (e.g., FBU 810) is configured to generate (e.g., transmit) a system wakeup signal 850 at a first time (e.g., time T0) in response to a user wakeup signal (such as generated by the sensors 402 and head unit 401). The system wakeup signal 850 is generated at a first output (e.g., cable 801). A second bus unit (e.g., SBU 820) is configured to generate (e.g., transmit) a system wakeup signal 851 at a second time (e.g., time T1, which follows the first time) in response to the system wakeup signal 850. The system wakeup signal 851 is generated at a second output (e.g., cable 802). A third bus unit (e.g., TBU 830) is configured to generate (e.g., transmit) a system wakeup signal 852 at a third time (e.g., time T2, which follows the second time) in response to the system wakeup signal 851. The system wakeup signal 852 is generated at a third output (e.g., cable 803). A fourth bus unit (e.g., fourth bus unit 840) is configured to generate (e.g., transmit) a system wakeup signal 853 at a fourth time (e.g., time T3, which follows the third time) in response to the system wakeup signal 852. The system wakeup signal 853 is generated at a fourth output (e.g., cable 804).

Figure 9:
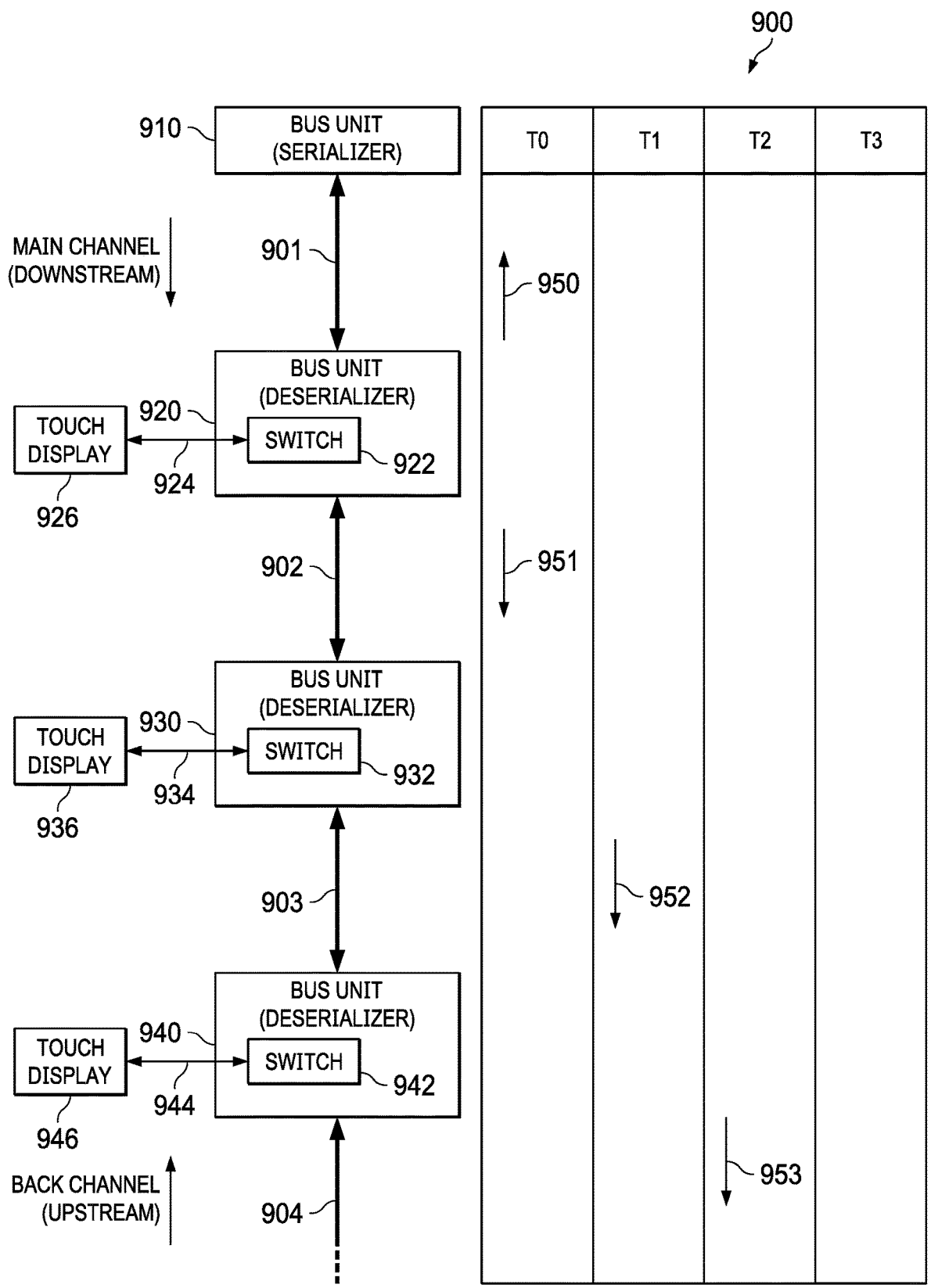
FIG. 9 is a block diagram of a second example wakeup signal handling scenario in an example system.

FIG. 9 is a block diagram of a second example wakeup signal handling scenario in an example system. In the example, the system 900 includes serially chained bus units such as 910, 920, 930, and 940. The bus units can be deserializers and/or disaggregators.

The FBU 910 can be similar to the multistream generator 410 and/or FBU 510. The FBU 910 can be locally coupled to various devices (e.g., sensors 402 and head unit 401), which can generate a local wakeup signal in response to input generated by any coupled sensor. The FBU 910 is upstream of the SBU 920. The FBU 910 is coupled to the SBU 920 via a cable 901. The cable 901 (and each of the cables 902, 903, and 904) can be a cable harness that includes conductor(s) for sending and/or receiving wakeup signals. In some examples, conductors reserved as "lanes" for video streaming in an active mode can be used to transmit a wakeup signal to an adjacent bus unit that is in a power conservation mode.

The FBU 910 is coupled to the second bus unit (SBU) 920 via cable 901. The SBU 920 is locally coupled via cable 924 to the touch display 926 (which can be similar to touch display 572), where the SBU 920 is configured to disaggregate (by switch 922) a video in active mode and send a disaggregated stream to the touch display 926. The SBU 920 is coupled to the third bus unit (TBU) 930 via cable 902. The TBU 930 is locally coupled via cable 934 to the touch display 936 (which can be similar to touch display 573), where the TBU 930 is configured to disaggregate (by switch 932) a video in active mode and send a disaggregated stream to the touch display 936. The TBU 930 is coupled to the fourth bus unit 940 via cable 903. The fourth bus unit 940 is locally coupled via cable 944 to the touch display 946 (which can be similar to touch display 574), where the fourth bus unit 940 is configured to disaggregate (by switch 942) a video in active mode and send a disaggregated stream to the touch display 946. The fourth bus unit 940 can be coupled to an adjacent (e.g., downstream) bus unit via a cable 904 (where even more downstream bus units can be serially chained in along a system bus, where each of the additional downstream units can be locally coupled with similar circuits).

In the second example scenario, a first bus unit (e.g., SBU 920) is configured to generate (e.g., transmit) a system wakeup signal 950 at a first time (e.g., time T0) in response to a user wakeup signal (such as generated by the touch display 926). The system wakeup signal 950 is generated at a first output (e.g., cable 901). The first bus unit (e.g., SBU 920) is further configured to generate (e.g., transmit) a system wakeup signal 951 at the first time (e.g., time T0) in response to the user wakeup signal (such as generated by the touch display 926). The system wakeup signal 951 is generated at a second output (e.g., cable 902). A second bus unit (e.g., TBU 930) is configured to generate (e.g., transmit) a system wakeup signal 952 at a second time (e.g., time T1, which follows the first time) in response to the system wakeup signal 951. The system wakeup signal 952 is generated at a third output (e.g., cable 903). A third bus unit (e.g., fourth bus unit 940) is configured to generate (e.g., transmit) a system wakeup signal 953 at a third time (e.g., time T2, which follows the second time) in response to the system wakeup signal 952. The system wakeup signal 953 is generated at a fourth output (e.g., cable 904).

Figure 10:
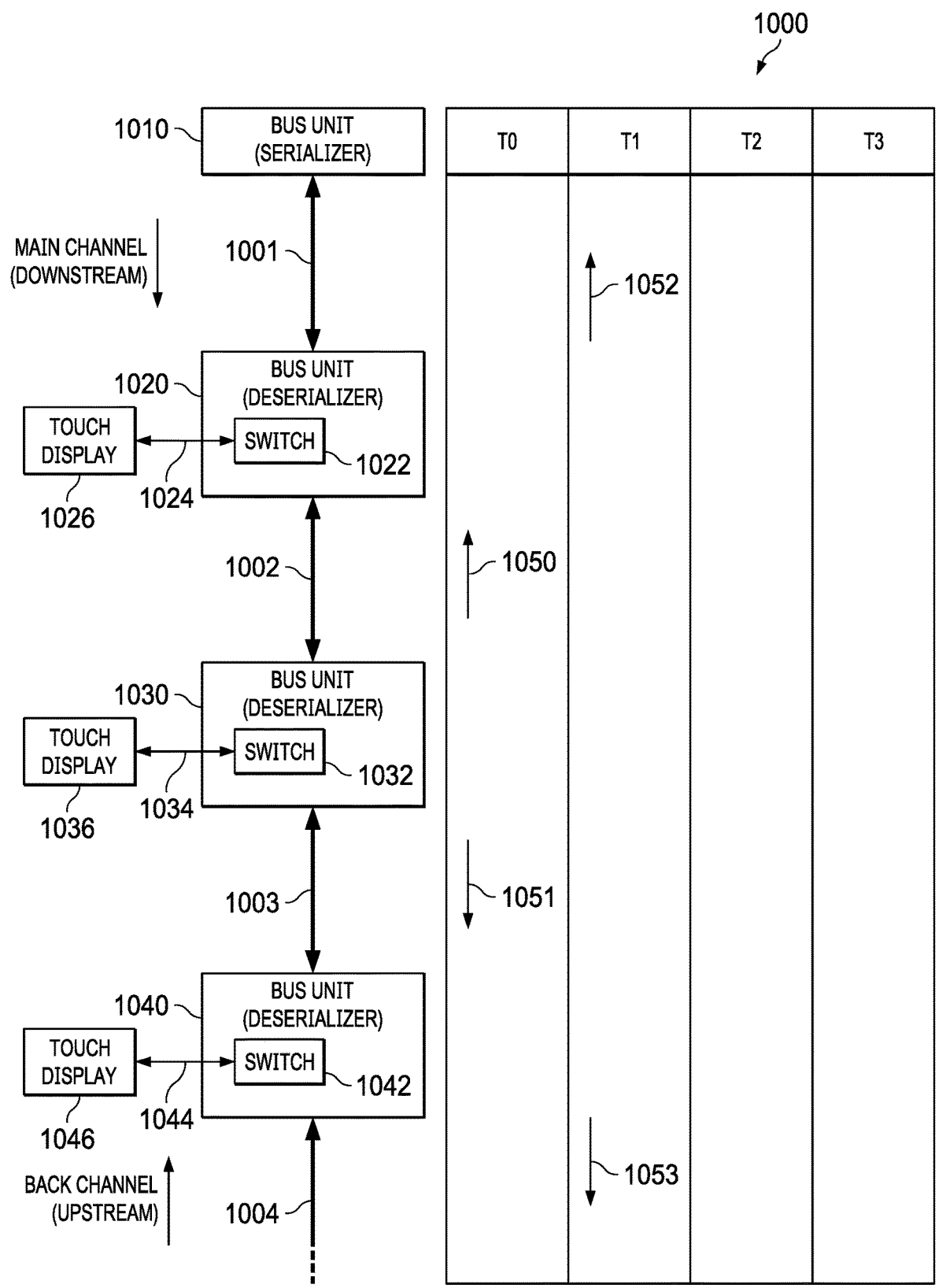
FIG. 10 is a block diagram of a third example wakeup signal handling scenario in an example system.

FIG. 10 is a block diagram of a third example wakeup signal handling scenario in an example system. In the example, the system 1000 includes serially chained bus units such as 1010, 1020, 1030, and 1040. The bus units can be deserializers and/or disaggregators.

The FBU 1010 can be similar to the multistream generator 410 and/or FBU 510. The FBU 1010 can be locally coupled to various devices (e.g., sensors 402 and head unit 401), which can generate a local wakeup signal in response to input generated by any coupled sensor. The FBU 1010 is upstream of the SBU 1020. The FBU 1010 is coupled to the SBU 1020 via a cable 1001. The cable 1001 (and each of the cables 1002, 1003, and 1004) can be a cable harness that includes conductor(s) for sending and/or receiving wakeup signals. In some examples, conductors reserved as "lanes" for video streaming in an active mode can be used to transmit a wakeup signal to an adjacent bus unit that is in a power conservation mode.

The FBU 1010 is coupled to the second bus unit (SBU) 1020 via cable 1001. The SBU 1020 is locally coupled via cable 1024 to the touch display 1026 (which can be similar to touch display 572), where the SBU 1020 is configured to disaggregate (by switch 1022) a video in active mode and send a disaggregated stream to the touch display 1026. The SBU 1020 is coupled to the third bus unit (TBU) 1030 via cable 1002. The TBU 1030 is locally coupled via cable 1034 to the touch display 1036 (which can be similar to touch display 573), where the TBU 1030 is configured to disaggregate (by switch 1032) a video in active mode and send a disaggregated stream to the touch display 1036. The TBU 1030 is coupled to the fourth bus unit 1040 via cable 1003. The fourth bus unit 1040 is locally coupled via cable 1044 to the touch display 1046 (which can be similar to touch display 574), where the fourth bus unit 1040 is configured to disaggregate (by switch 1042) a video in active mode and send a disaggregated stream to the touch display 1046. The fourth bus unit 1040 can be coupled to an adjacent (e.g., downstream) bus unit via a cable 1004 (where even more downstream bus units can be serially chained in along a system bus, where each of the additional downstream units can be locally coupled with similar circuits).

In the third example scenario, a first bus unit (e.g., SBU 1030) is configured to generate (e.g., transmit) a system wakeup signal 1050 at a first time (e.g., time T0) in response to a user wakeup signal (such as generated by the touch display 1036). The system wakeup signal 1050 is generated at a first output (e.g., cable 1002). The first bus unit (e.g., SBU 1030) is further configured to generate (e.g., transmit) a system wakeup signal 1051 at the first time (e.g., time T0) in response to the user wakeup signal (such as generated by the touch display 1036). The system wakeup signal 1051 is generated at a second output (e.g., cable 1003). A second bus unit (e.g., TBU 1020) is configured to generate (e.g., transmit) a system wakeup signal 1052 at a second time (e.g., time T1, which follows the first time) in response to the system wakeup signal 1050. The system wakeup signal 1052 is generated at a third output (e.g., cable 1001). A third bus unit (e.g., fourth bus unit 1040) is configured to generate (e.g., transmit) a system wakeup signal 1053 at the second time (e.g., time T1, which follows the first time) in response to the system wakeup signal 1051. The system wakeup signal 1053 is generated at a fourth output (e.g., cable 1004).

Figure 11:
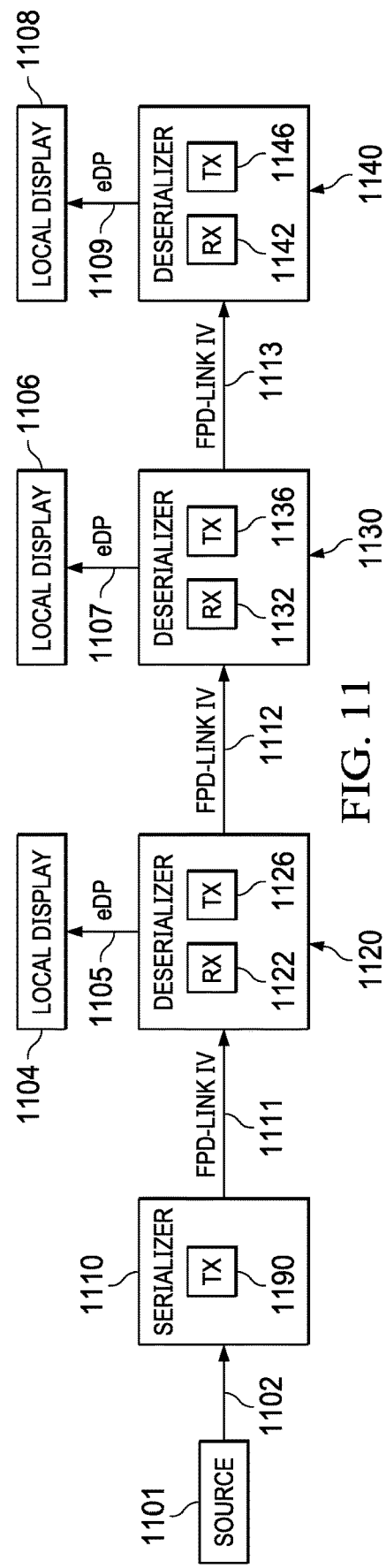
FIG. 11 is a block diagram of another example system that includes at least one stream disaggregator adapted to selectively forward transmissions between serially chained devices.

FIG. 11 is a block diagram of another example system that includes at least one stream disaggregator adapted to selectively forward transmissions between serially chained devices. For example, the system 1100 is an example system that includes a source 1101, a serializer 1110 (coupled to source 1101 via cable 1102), a deserializer 1120 (e.g., coupled locally to local display 1104 via cable 1105), a deserializer 1130 (e.g., coupled locally to local display 1106 via cable 1107), and a deserializer 1140 (e.g., coupled locally to local display 1108 via cable 1109).

The cables 1111, 1112, and 1113 each include physical media, through which a system protocol (e.g., system bus) is implemented. The system protocol can be either unidirectional or bidirectional. In an implementation of a bidirectional system protocol: a first bidirectional serial link is established between serializer 1110 and deserializer 1120 across cable 1111 (which is coupled between the serializer 1110 and deserializer 1120); a second bidirectional serial link is established between deserializer 1120 and deserializer 1130 across cable 1112 (which is coupled between the deserializer 1120 and deserializer 1130); and a third bidirectional serial link is established between deserializer 1130 and deserializer 1140 across cable 1113 (which is coupled between the deserializer 1130 and deserializer 1140).

The bidirectional serial link can be either asymmetric or symmetric. An example asymmetric bidirectional link includes an upstream speed (e.g., for bit traffic directed towards the serializer 1110) that is 165 megabits per second and includes a downstream speed (e.g., for bit traffic directed away from the serializer 1110) that is 13 gigabits per second. The asymmetric speeds allow high resolution video to be transmitted downstream at high bit rates (e.g., for transmitting various high-resolution video streams to selected displays), while still allowing a robust bidirectional system control and communication link between devices. An example asymmetric bidirectional link includes symmetric data speeds, so that data can be transferred in either direction at a full rate.

In an example, the source 1101 is a source such as head unit 401. The source 1101 is coupled to the serializer 1110 via cable 1102. Cable 1102 is arranged to carry at least one video stream in accordance with a protocol such as the MIPI CIS.

In the example, the serializer 1110 is a serializer such as multistream generator 410. The serializer 1110 includes a transmitter 1190 such as transmitter 390, which is adapted to transmit a multistream (e.g., which is generated by the serializer 1110 and that includes reformatted information of the at least one video stream carried across a cable 1102), so that the deserializer 1120 can receive and process (e.g., process portions of) the transmitted multistream.

In the example, the deserializer 1120 is a deserializer such as stream disaggregator 420. The deserializer 1120 is coupled to the serializer 1110 via cable 1111. The deserializer 1120 includes a receiver 1122 (such as receiver 422) that is arranged to receive information transmitted by the transmitter 1190. The deserializer 1120 includes a transmitter 1126 (such as stream forwarder 426) that is arranged to transmit information received from the transmitter 1190. Cable 1111 is arranged to carry a multistream output transmitted by the transmitter 1190 in accordance with a protocol such as FPD-link IV. The deserializer 1120 is coupled locally to local display 1104 (such as local display 404) via cable 1105. Cable 1105 is arranged to carry a selected video stream in accordance with a protocol such as eDP (extended display protocol).

In the example, the deserializer 1130 is a deserializer such as stream disaggregator 430. The deserializer 1130 is coupled to the serializer 1120 via cable 1112. The deserializer 1130 includes a receiver 1132 (such as receiver 422) that is arranged to receive information transmitted by the transmitter 1126. The deserializer 1130 includes a transmitter 1136 (such as stream forwarder 426) that is arranged to transmit information received from the transmitter 1126. Cable 1112 is arranged to carry a multistream output transmitted by the transmitter 1126 in accordance with a protocol such as FPD-link IV. The deserializer 1130 is coupled locally to local display 1106 (such as local display 406) via cable 1107. Cable 1107 is arranged to carry a selected video stream in accordance with a protocol such as eDP.

In the example, the deserializer 1140 is a deserializer such as stream disaggregator 440. The deserializer 1140 is coupled to the serializer 1130 via cable 1113. The deserializer 1140 includes a receiver 1142 (such as receiver 422) that is arranged to receive information transmitted by the transmitter 1136. The deserializer 1140 optionally includes a transmitter 1146 (such as stream forwarder 426) that is arranged to transmit information received from the transmitter 1136. Cable 1113 is arranged to carry a multistream output transmitted by the transmitter 1136 in accordance with a protocol such as FPD-link IV. The deserializer 1140 is coupled locally to local display 1108 (such as local display 408) via cable 1109. Cable 1109 is arranged to carry a selected video stream in accordance with a protocol such as eDP.

When, for example, the last deserializer in a chain only receives data intended (e.g., addressed) for display on the respective local display that is coupled locally to the last deserializer, the last deserializer need not include a switch such as switch 427.

Modifications are possible in the described embodiments, and other embodiments are possible, within the scope of the claims.

What is claimed is:

1. A circuit, comprising:
a transceiver having a first system port, a second system port, a local port, a first output, a second output and a wakeup input, the first system port adapted to receive a first system input signal, the second system port adapted to receive a second system input signal, the local port adapted to receive a local input signal, the transceiver configured to transfer data of the first system input signal to the second system port in a first mode, the transceiver configured to conserve power in a second mode, the transceiver configured to enter the first mode in response to a local wakeup signal applied to the wakeup input, and the transceiver configured to transmit a system wakeup signal at the second system port in response to the local wakeup signal;

a touch display having an output coupled to the local port; and a controller having a first system input, a local input and a wakeup output, the first system input coupled to the first output of the transceiver, the local input coupled to the second output of the transceiver and the wakeup output coupled to the wakeup input, and the controller configured to generate the local wakeup signal at the wakeup output in response to an energy detected signal on the output of the touch display wherein the energy detected signal is activated when the touch display is activated.

2. The circuit of claim 1, wherein the transceiver is further configured to transfer data of the second system input signal to the first system port in the first mode.

3. The circuit of claim 2, wherein the system wakeup signal includes a wakeup pattern.

4. The circuit of claim 1, wherein the transceiver is further configured to transmit the system wakeup signal at the first system port in response to the local wakeup signal in the second mode.

5. The circuit of claim 3, wherein the controller further comprises a data valid output, the controller configured to generate a data valid signal at the data valid output responsive to a detection of the wakeup pattern in one of the first system input signal and the local input signal.

* * * * *